US008134906B2

(12) United States Patent
Bates et al.

(10) Patent No.: US 8,134,906 B2
(45) Date of Patent: Mar. 13, 2012

(54) APPARATUS AND METHOD TO OPTIMIZE THE PERFORMANCE OF A HOLOGRAPHIC DATA STORAGE SYSTEM

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 11/830,373

(22) Filed: Jul. 30, 2007

(65) Prior Publication Data
US 2009/0034035 A1 Feb. 5, 2009

(51) Int. Cl.
*G11B 7/00* (2006.01)
(52) U.S. Cl. ....................................................... 369/103
(58) Field of Classification Search .................. 369/103, 369/44.27, 44.28, 44.29; 359/22, 34, 32, 359/35, 216
See application file for complete search history.

(56) References Cited

U.S. PATENT DOCUMENTS

| 4,642,803 | A | 2/1987 | Drexler |
| 4,969,139 | A | 11/1990 | Azumatani et al. |
| 5,210,735 | A | 5/1993 | Hoshino et al. |
| 5,396,476 | A | 3/1995 | Asthana |
| 7,116,626 | B1 * | 10/2006 | Woods et al. ................. 369/103 |
| 2008/0062796 | A1 * | 3/2008 | Bates et al. ................... 365/216 |

FOREIGN PATENT DOCUMENTS

| JP | 03168926 | 7/1991 |
| JP | 04167229 | 6/1992 |
| JP | 10149556 | 2/1998 |
| JP | 11353682 | 12/1999 |
| JP | 2004146020 | 5/2004 |

OTHER PUBLICATIONS

Ikegami et al., "Contamination Notification and Recovery for Optical Disk Drive", TDB v37, n8, Aug. 1994, pp. 67-68.
Klodnicki, "Distinguishing Between Media Flaws and Contamination in Optical Drives", TDB v38, n5, May 1995, pp. 371-376.

* cited by examiner

*Primary Examiner* — Nabil Z Hindi
(74) *Attorney, Agent, or Firm* — Dale F. Regelman; Quarles & Brady LLP

(57) ABSTRACT

A method is disclosed to optimize the performance of a holographic data storage system, where that holographic data storage system comprises a plurality of calibratable components, and where each of the plurality of calibratable components comprises one or operational parameters, and where each of those operational parameter is associated with a nominal range. The method seriatim tests each calibratable component and measures the one or more operational parameters for that device. The method determines if the one or more operational parameters associated with each of the calibratable components fall within the associated nominal ranges. If an operational parameter associated with a selected calibratable component fall outside the associated nominal range, then the method recalibrates that selected calibratable component.

18 Claims, 23 Drawing Sheets

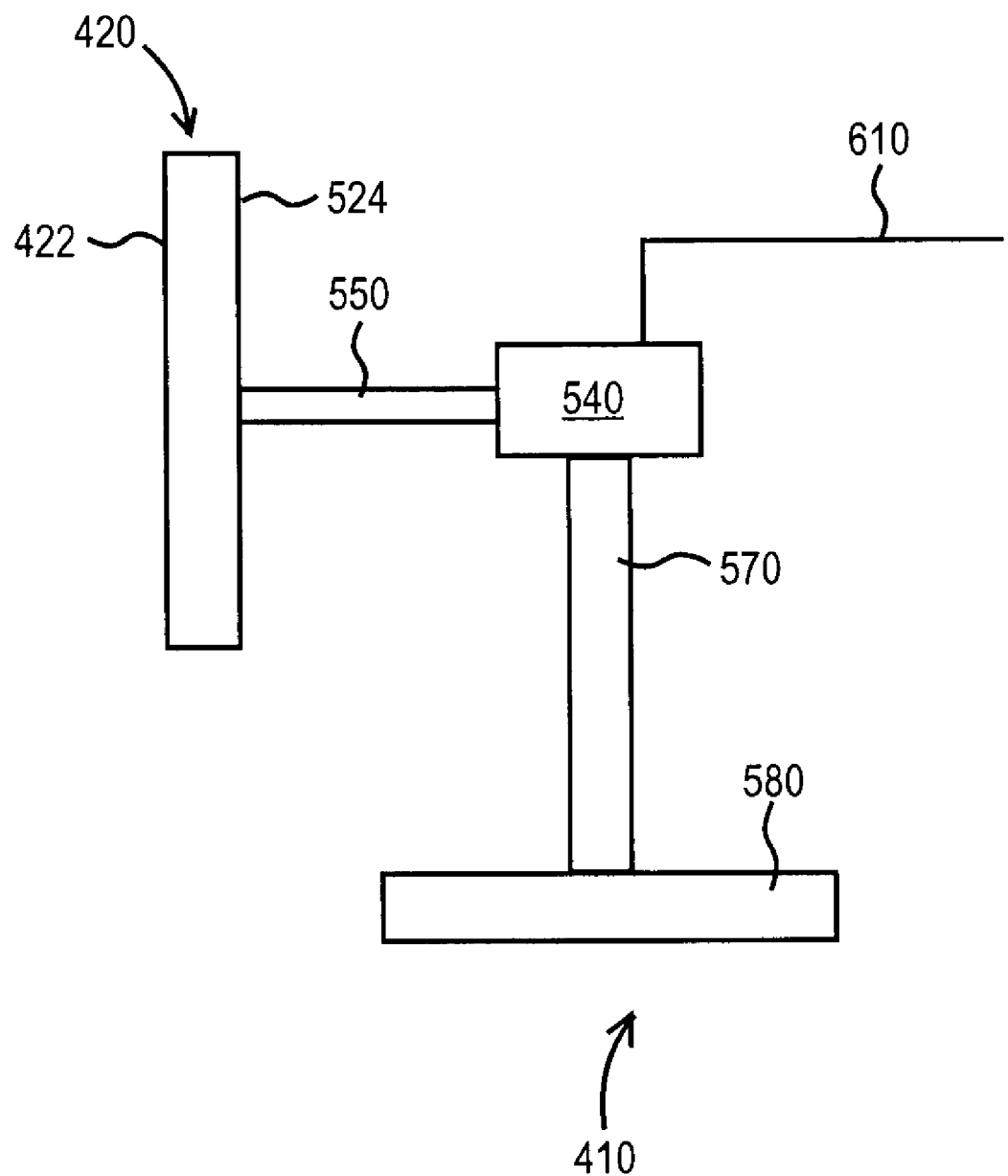

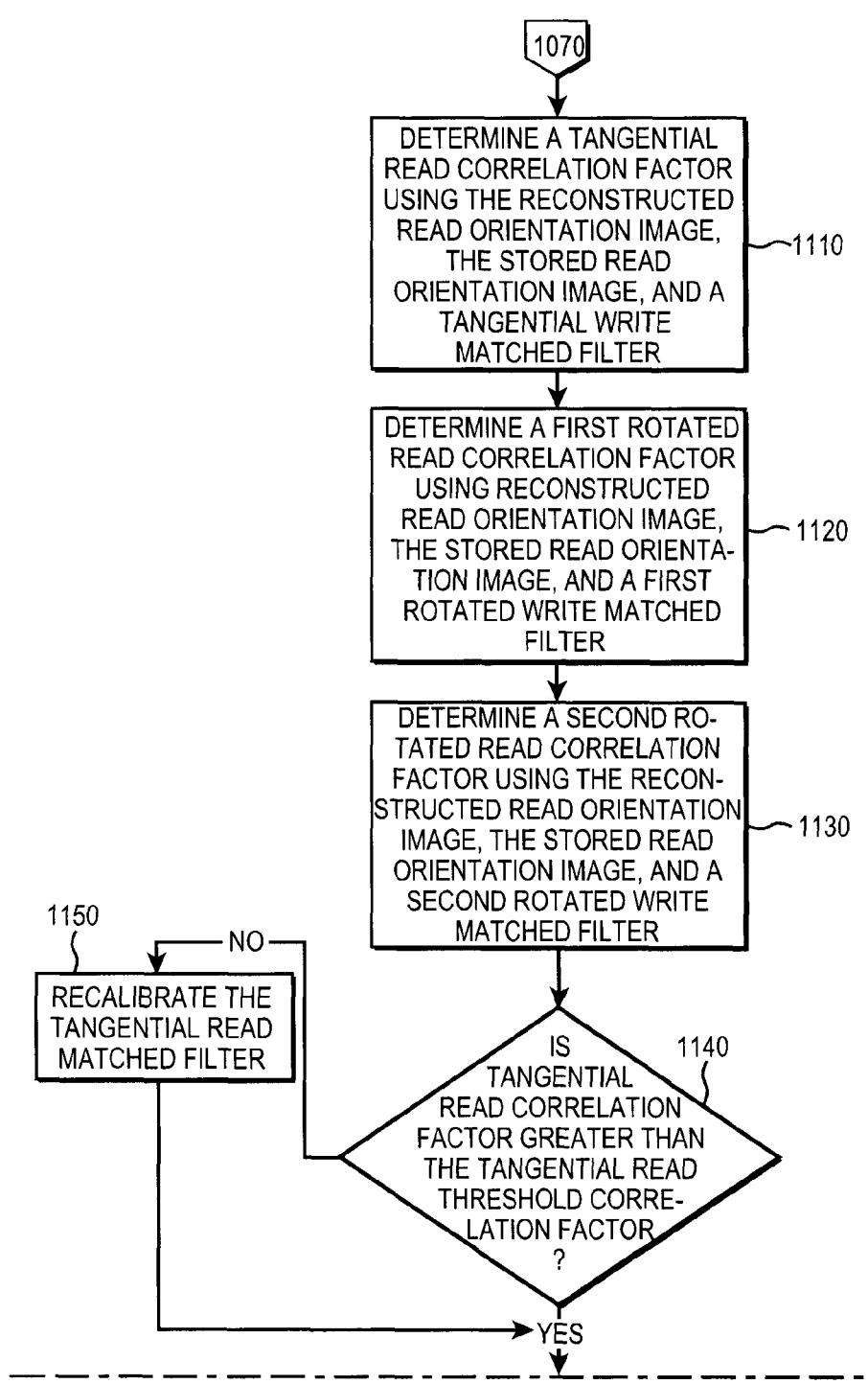

| FIG. 15A |
| FIG. 15B |

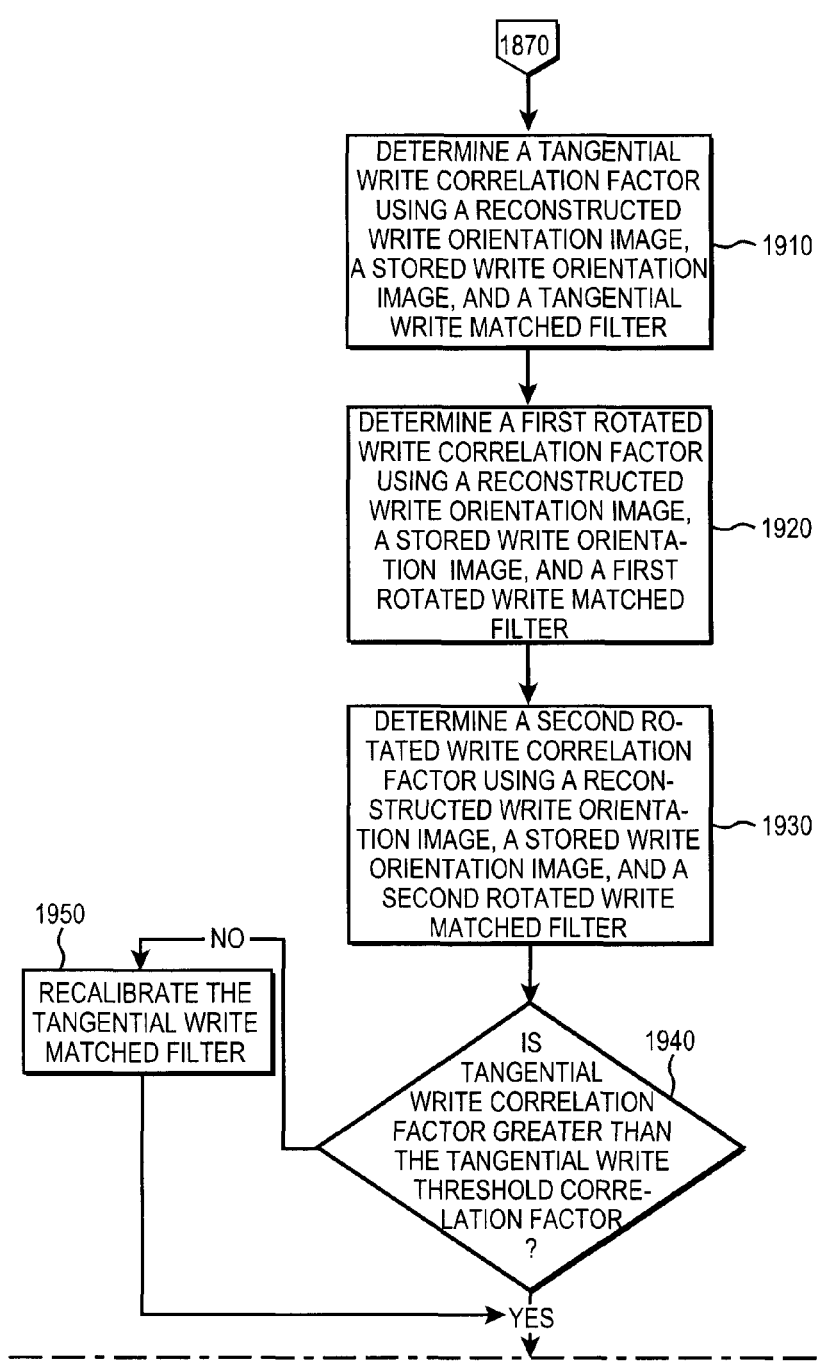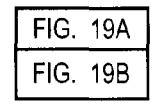

APPARATUS AND METHOD TO OPTIMIZE THE PERFORMANCE OF A HOLOGRAPHIC DATA STORAGE SYSTEM

FIELD OF THE INVENTION

This invention relates to an apparatus, and method using that apparatus, to optimize the performance of a holographic data storage system.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce—for example, a simple collimated beam with a planar wavefront.

The resulting optical interference pattern, of the two coherent laser beams, causes chemical and/or physical changes in the photosensitive medium: a replica of the interference pattern is stored as a change in the absorption, refractive index, or thickness of the photosensitive medium. When the stored interference pattern is illuminated with one of the two waves that was used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

Applicants' invention comprises a method to optimize the performance of a holographic data storage system, where that holographic data storage system comprises a plurality of calibratable components, and where each of the plurality of calibratable components comprises one or operational parameters, and where each of those operational parameter is associated with a nominal range. The method seriatim tests each calibratable component, measures the one or more operational parameters for that device.

The method then determines if the one or more operational parameters associated with each of the calibratable components fall within the associated nominal range. If an operational parameter associated with a selected calibratable component fall outside the associated nominal range, then the method recalibrates that selected calibratable component.

BRIEF DESCRIPTION OF THE DRAWINGS

The invention will be better understood from a reading of the following detailed description taken in conjunction with the drawings in which like reference designators are used to designate like elements, and in which:

FIG. 6 is a side view of a second embodiment of Applicants' optical detector;

FIG. 11A and FIG. 11B are flow charts summarizing certain additional steps of Applicants' method to check the calibration of a plurality of read matched filters;

FIG. 19A and FIG. 19B are a flow charts summarizing certain additional steps of Applicants' method to check the calibration of a plurality of write matched filters.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
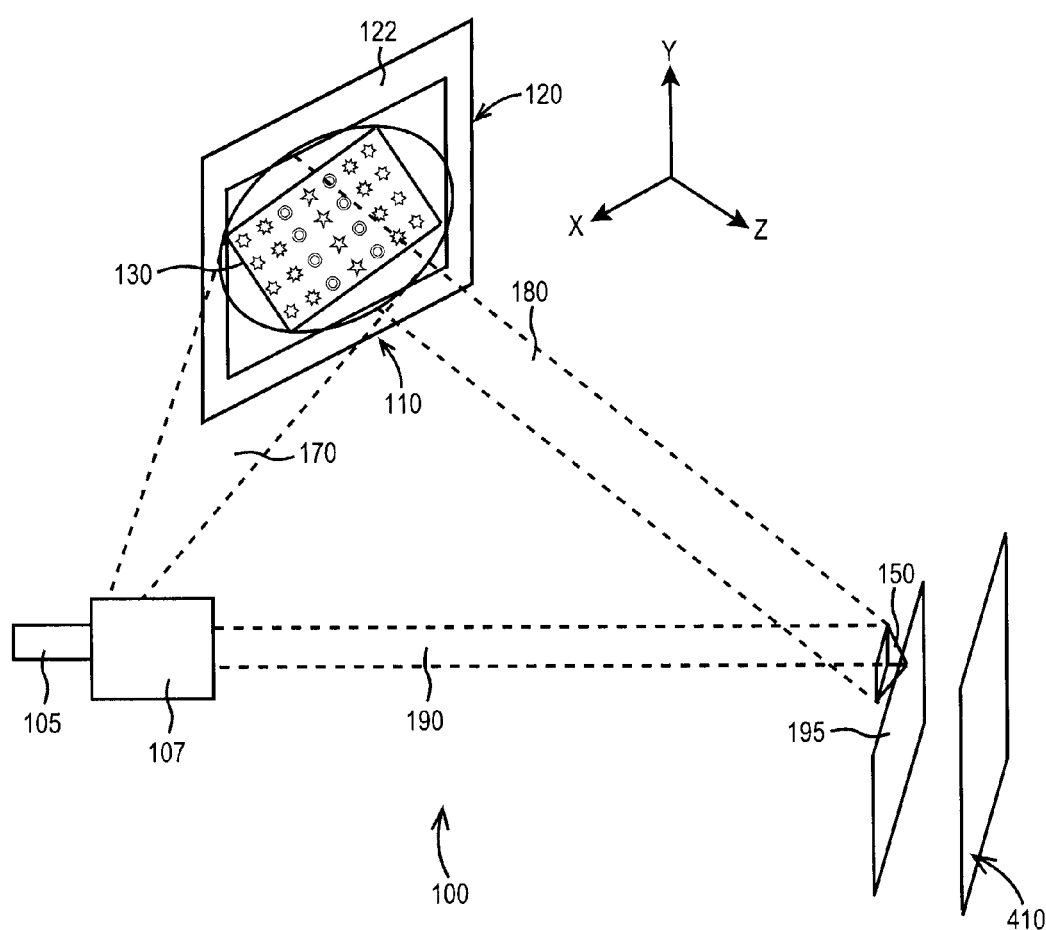
FIG. 1A is a perspective view of Applicants' holographic data storage system as used to encode information into a holographic data storage medium.
Figure 1B:
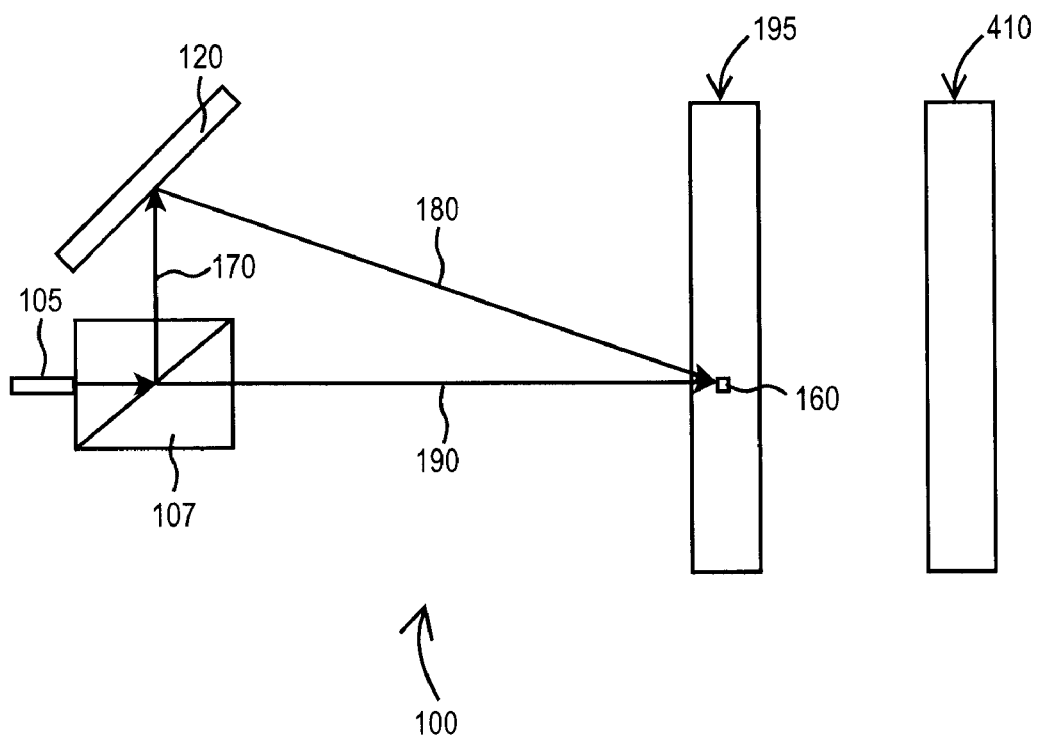
FIG. 1B is a top view of the apparatus of FIG. 1A.

Referring now to FIGS. 1A and 1B, holographic information recording apparatus 100 (FIGS. 1A, 1B, 4A, 4B) comprises lasing device 105, beam splitter 107, reflective spatial light modulator 110, and holographic storage medium 195. The light generated by source 105 is split by beam splitter 107 into reference beam 190, and carrier beam 170.

Figure 2A:
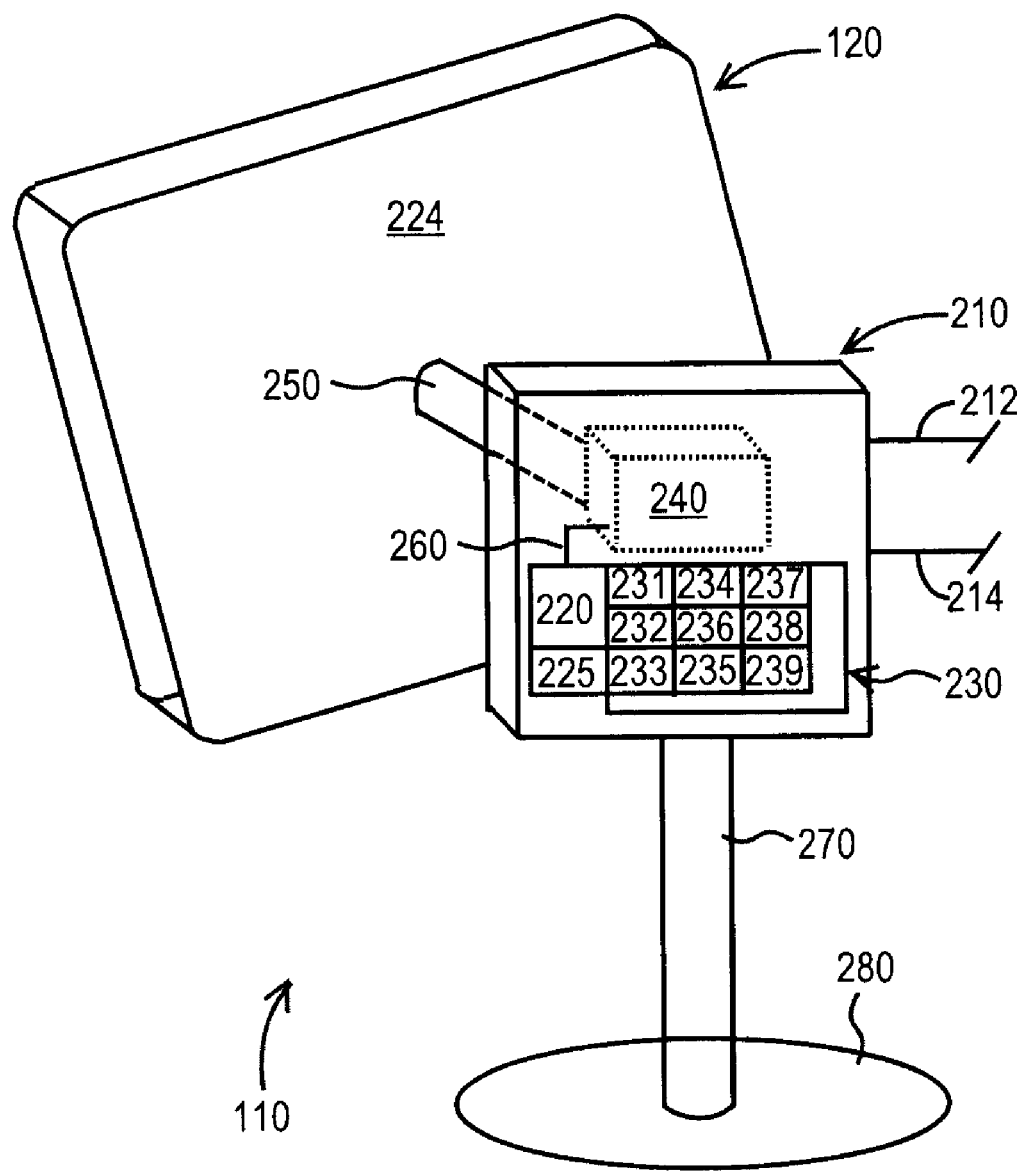
FIG. 2A is a perspective view of a portion of one embodiment of Applicants' spatial light modulator.
Figure 7:
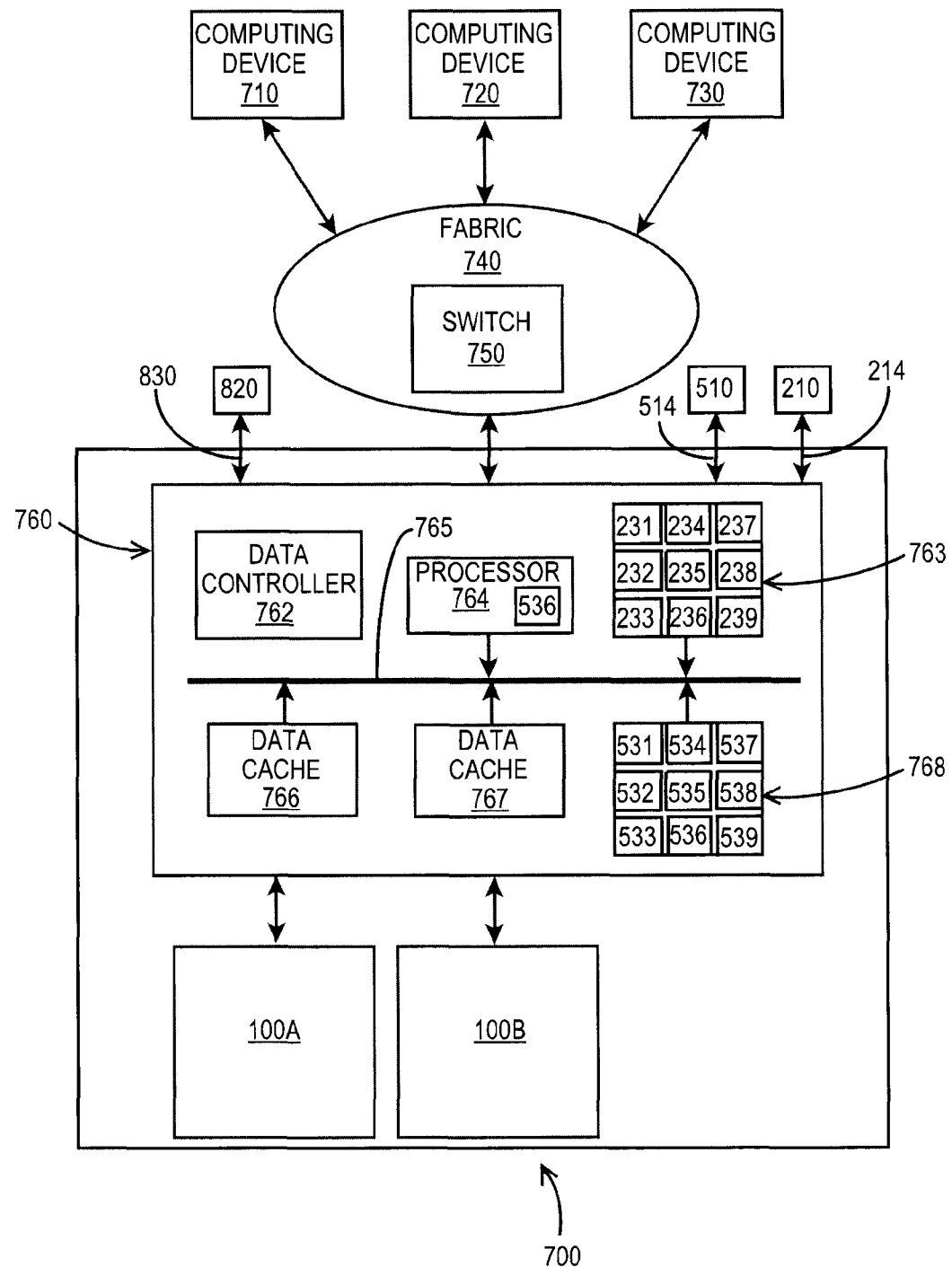
FIG. 7 is a block diagram showing Applicants' storage controller shown in communication with a plurality of computing devices and in communication with a plurality of holographic data storage systems.

Reflective spatial light modulator ("RSLM") 110 comprises display screen 120. In the illustrated embodiment of FIG. 1A, an image 130 is shown displayed on display screen 120 wherein image 120 comprises write orientation image 231 (FIGS. 2A, 7). In certain embodiments, display screen 120 comprises an active region 122 comprising an assembly comprising a plurality of micro mirrors. In other embodiments, active region 122 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 170 picks up image 130 as the light is reflected off display screen 120 to form reflected data beam 180 comprising image 130. Unreflected reference beam 190 interferes with data beam 180 to form hologram 150 which is stored as interference pattern 160. Hologram 150 is formed within storage medium 195 thereby forming interference pattern 160 in the photo-active storage medium.

Figure 2B:
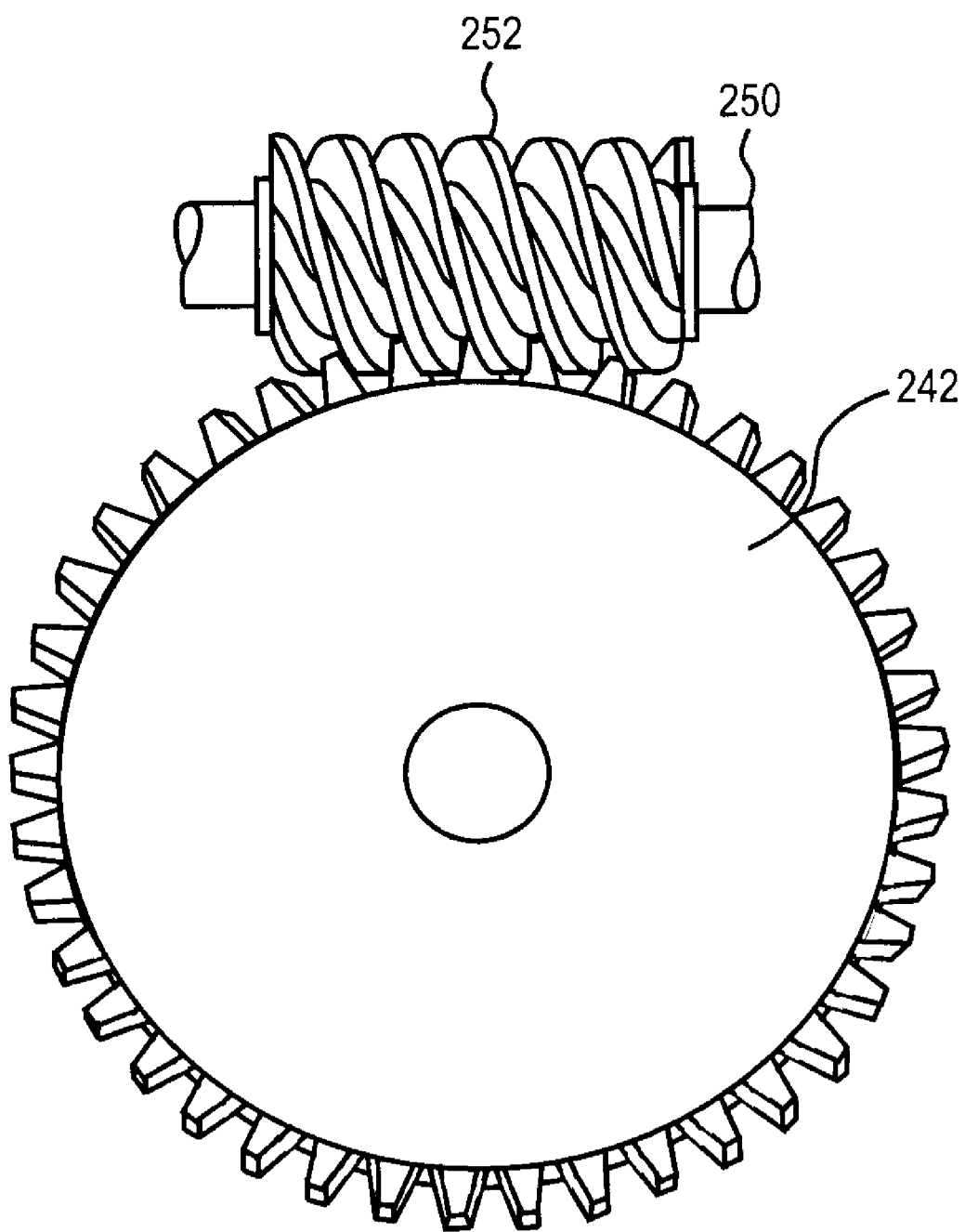
FIG. 2B is a side view of a worm gear drive disposed in certain embodiments within the spatial light modulator of FIG. 2A.
Figure 3:
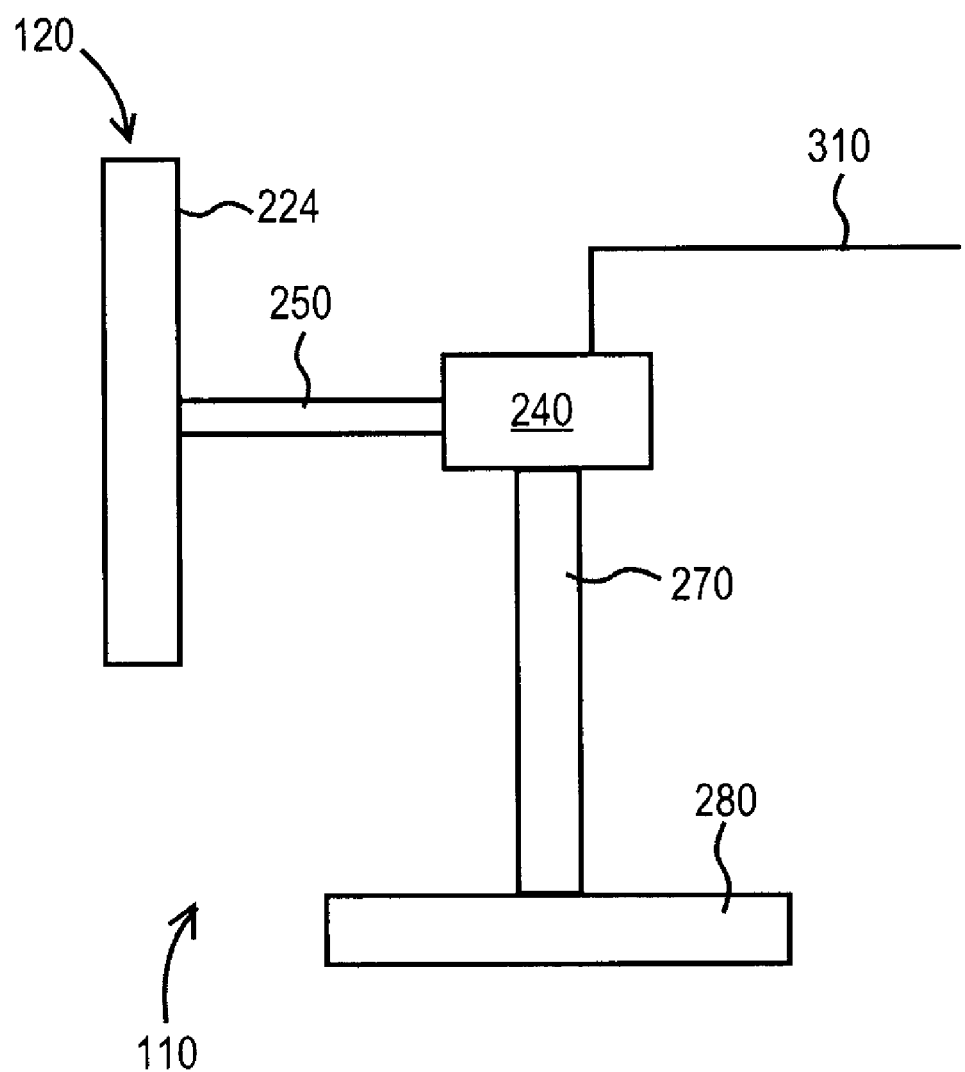
FIG. 3 is a side view of a second embodiment of Applicants' spatial light modulator.

Referring now to FIGS. 2A, 2B, and 3, reflective spatial light modulator 110 further comprises position-error-servo ("PES") 240. As those skilled in the art will appreciate, a servo comprises a device comprising an output shaft, such as rotatable shaft 250. Rotatable shaft 250 can be positioned to specific angular positions by sending PES 240 a pre-defined coded signal. As long as that coded signal exists on input line 260, PES 240 will maintain the associated angular position of shaft 250. As the coded signal changes, the angular position of the shaft 250 changes. Referring now to FIG. 2B, in certain embodiments PES 240 comprises a rotatable worm wheel 242, and shaft 250 comprises a spirally-threaded portion 252, wherein spiral-threaded portion 252 meshes with worm wheel 242 for precise angular movement of worm wheel 242.

In the illustrated embodiment of FIGS. 2A and 3, PES 240 is interconnected by rotatable shaft 250 with rear portion 224 of display screen element 120 (FIGS. 1A, 2A, 3) of reflective spatial light modulator 110 (FIGS. 1A, 2A, 3, 4A, 4B). PES 240 can cause reflective display screen 120 to rotate around the Z axis of FIG. 1A in a first direction, or to rotate in a second and opposite direction, by causing rotatable shaft 250 to rotate in the first direction or in the second direction.

In certain embodiments, reflective spatial light modulator 110 further comprises a floor stand 280 and vertical pillar 270, wherein PES 240 is attached to vertical pillar 270. In the illustrated embodiment of FIG. 3, communication link 310 interconnects PES 240 with an external controller, such as storage controller 760 (FIG. 7).

In the illustrated embodiment of FIG. 2A, reflective spatial light modulator 110 further comprises SLM controller 210. In certain embodiments, SLM controller 210 is interconnected with optical detector controller 410 (FIGS. 1A, 1B, 4A, 4B, 5A and 6) via communication link 212 which connects to communication link 512 (FIG. 5A). In certain embodiments, SLM controller 210 is interconnected with storage controller 760 (FIG. 7) via communication link 214 connecting to data bus 765 (FIG. 7).

In the illustrated embodiment of FIG. 2A, SLM controller 210 further comprises processor 220, instructions 225, and memory 230. Processor 220 utilizes instructions 225 to operate SLM 210. In certain embodiments, instructions 225 are integral with processor 220

In certain embodiments, memory 230 comprises non-volatile memory, such as and without limitation, battery backed-up RAM, a magnetic disk in combination with the associated software, firmware, and hardware, to read information from, and write information to, that magnetic disk, an optical disk in combination with the associated software, firmware, and hardware, to read information from, and write information to, that optical disk, an electronic storage medium, and the like. By "electronic storage medium," Applicants mean, for example, a device such as a PROM, EPROM, EEPROM, Flash PROM, compactflash, smartmedia, and the like.

In the illustrated embodiment of FIG. 2A, stored write orientation image 231 (FIGS. 2A, 7), tangential write threshold correlation factor 232 (FIGS. 2A, 7), tangential write matched filter 233 (FIGS. 2A, 7), first rotated write threshold correlation factor 234 (FIGS. 2A, 7), first rotated write matched filter 235 (FIGS. 2A, 7), second rotated write threshold correlation factor 236 (FIGS. 2A, 7), second rotated write matched filter 237 (FIGS. 2A, 7), PES calibration test protocol 238 (FIGS. 2A, 7), and PES operational parameters and nominal ranges 239 (FIGS. 2A, 7), are written to memory 230.

Figure 4A:
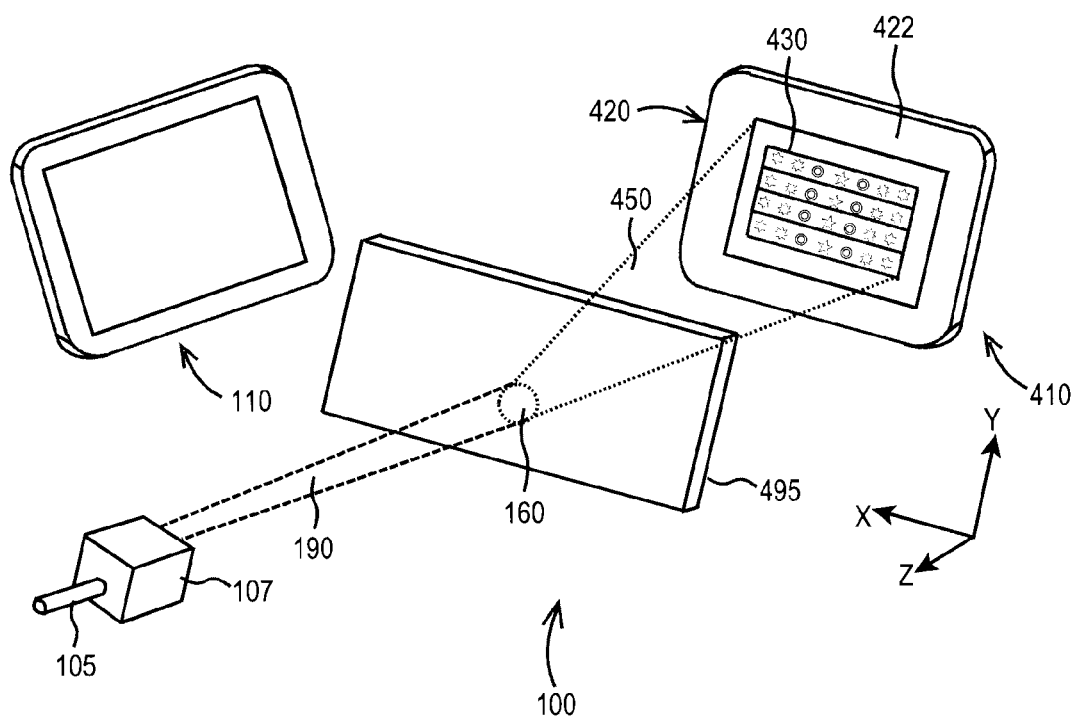
FIG. 4A shows Applicants' holographic data storage system projecting a write data beam onto Applicants' optical detector.
Figure 4B:
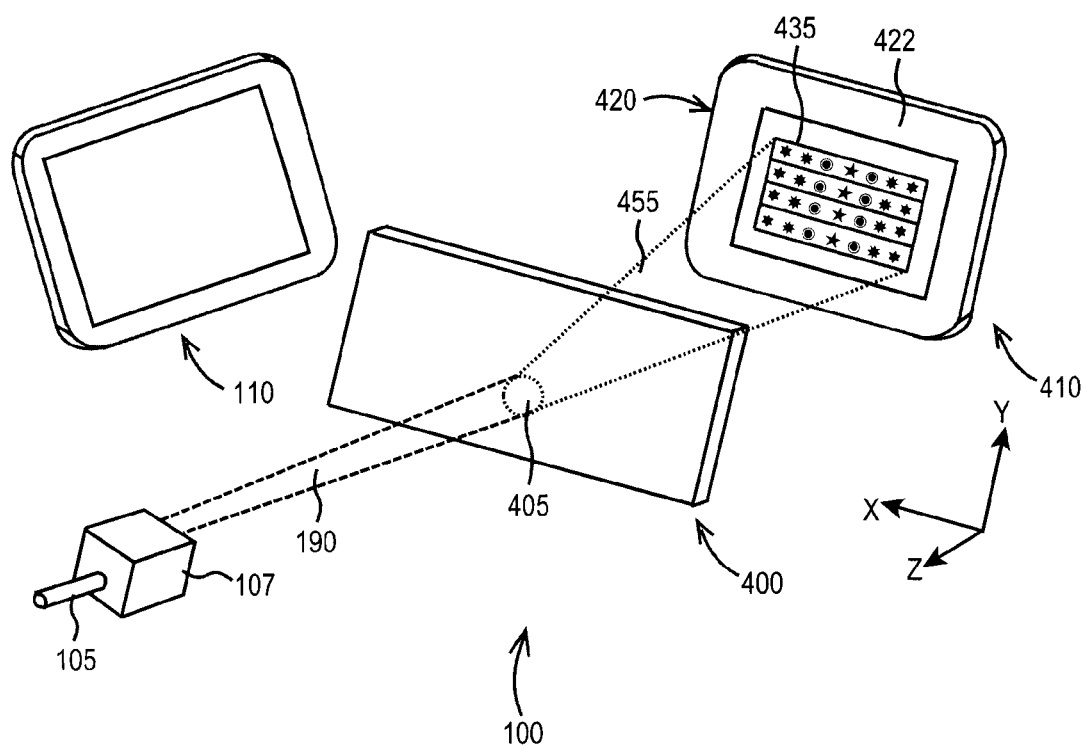
FIG. 4B shows Applicants' holographic data storage system projecting a read data beam onto Applicants' optical detector.
Figure 5A:
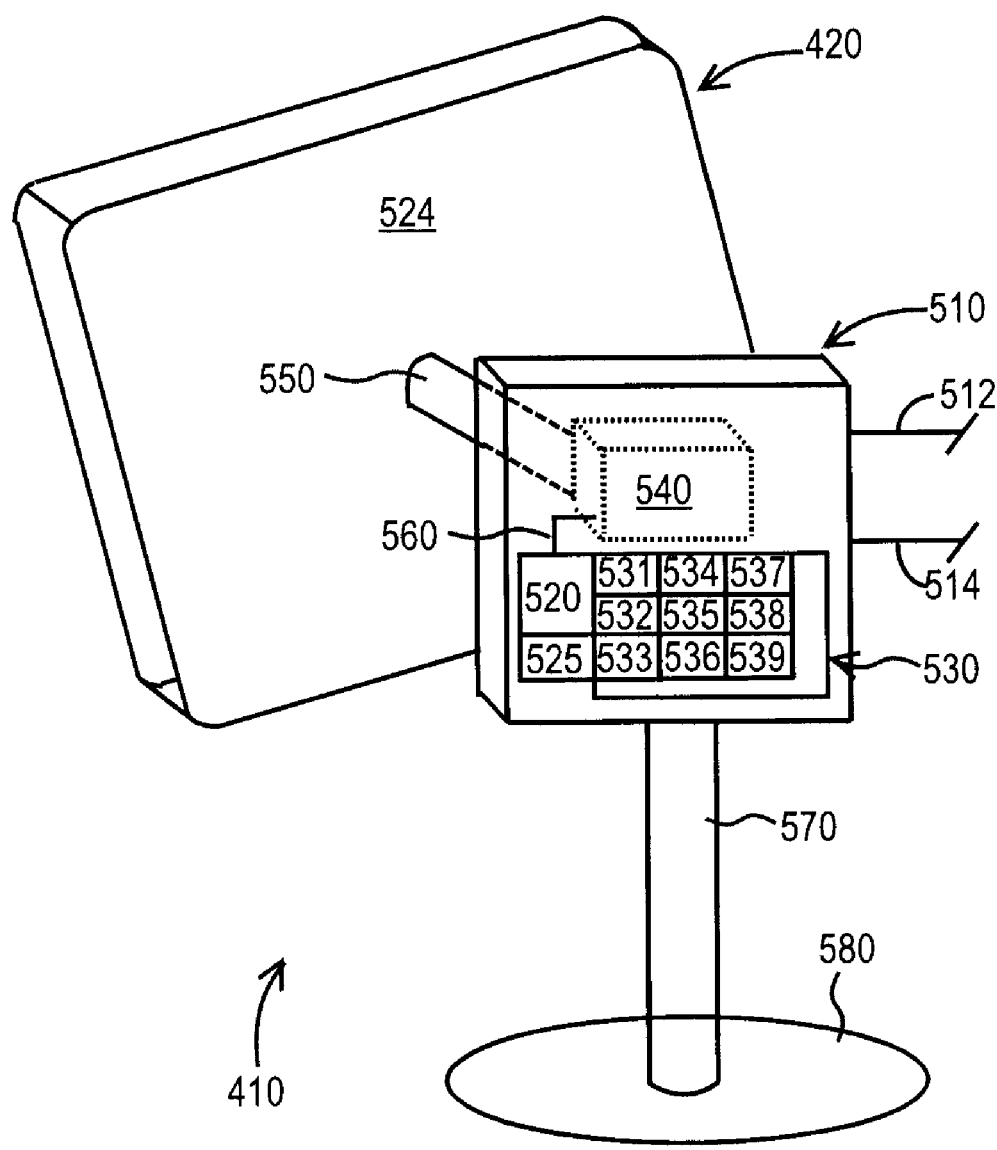
FIG. 5A is a perspective view of a portion of one embodiment of Applicants' optical detector.

Referring now to FIGS. 4A and 4B, FIG. 4A shows reference beam 190 directed toward encoded holographic storage medium 495 such that reference beam 190 is diffracted by the interference pattern 160 (FIG. 1B) to form write data beam 450 which comprises a reconstructed write orientation image 430. Image 430 is projected onto the input screen 420 of optical detector 410 (FIGS. 1A, 1B, 4A, 4B, 5A, 6). FIG. 4B shows reference beam 190 directed toward encoded holographic storage medium 400 such that reference beam 190 is diffracted by the interference pattern 405 to form read data beam 455 which comprises a reconstructed read orientation image 435. Image 435 is projected onto the input screen 420 of optical detector 410 (FIGS. 1A, 1B, 4A, 4B, 5A, 6). Input screen 420 is held by frame 422 (FIGS. 4A, 4B, 6).

Figure 5B:
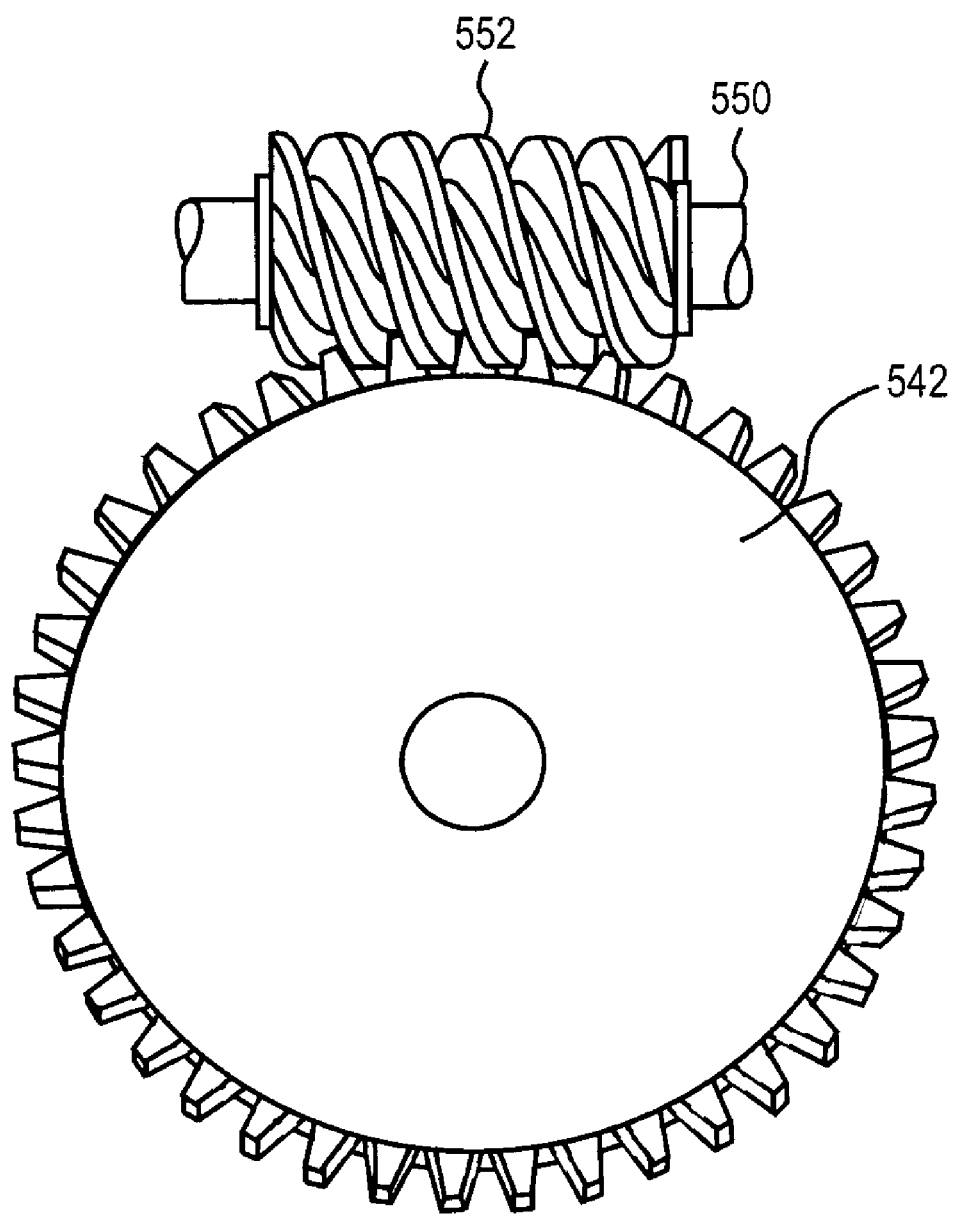
FIG. 5B is a side view of a worm gear drive disposed in certain embodiments within the optical detector of FIG. 5A.

Referring now to FIGS. 5A, 5B, and 6, optical detector 410 (FIGS. 1A, 1B, 4A, 4B, 5A and 6) further comprises rotation-error-servo ("RES") 540. Rotatable shaft 550 can be positioned to specific angular positions by sending RES 540 a pre-defined coded signal. As long as that coded signal exists on input line 560 (FIG. 5A) or input line 610 (FIG. 6), RES 540 will maintain the associated angular position of shaft 550. As the coded signal changes, the angular position of the shaft 550 changes. Referring now to FIG. 5B, in certain embodiments RES 540 comprises a rotatable worm wheel 542, and shaft 550 comprises a spirally-threaded portion 552, wherein spiral-threaded portion 552 meshes with worm wheel 542.

In the illustrated embodiment of FIGS. 5A and 6, RES 540 is interconnected with rear portion 524 of display screen 420 by rotatable shaft 550. RES 540 can cause input screen 420 of optical detector 410 (FIGS. 1A, 1B, 4A, 4B, 5A, 6) to rotate around the Z axis of FIGS. 4A and 4B in a first direction, or to rotate in a second and opposite direction, by causing rotatable shaft 550 to rotate in the first direction or in the second direction.

In certain embodiments, optical detector 410 (FIGS. 1A, 1B, 4A, 4B, 5A, 6) further comprises a floor stand 580 and vertical pillar 570. In the illustrated embodiment of FIG. 6, signal input line 610 interconnects RES 540 with an external controller, such as storage controller 760 (FIG. 7) via data bus 765.

In the illustrated embodiment of FIG. 5A, optical detector 410 (FIGS. 1A, 1B, 4A, 4B, 5A, 6) further comprises optical detector controller 510. In certain embodiments, optical detector controller 510 is interconnected with SLM controller 210 (FIG. 2A) via communication links 212 (FIG. 2A) and 512. In certain embodiments, optical detector controller 510 is interconnected with storage controller 760 (FIG. 7) via communication link 514 connecting to data bus 765.

In the illustrated embodiment of FIG. 5A, detector controller 510 further comprises processor 520, instructions 525, and memory 530. Processor 520 utilizes instructions 525 to operate optical detector 410 (FIGS. 1A, 1B, 4A, 4B, 5A, 6). In certain embodiments, instructions 525 are integral with processor 520.

In certain embodiments, memory 530 comprises non-volatile memory, such as and without limitation, battery backed-up RAM, a magnetic disk in combination with the associated software, firmware, and hardware, to read information from, and write information to, that magnetic disk, an optical disk in combination with the associated software, firmware, and hardware, to read information from, and write information to, that optical disk, an electronic storage medium, and the like. By "electronic storage medium," Applicants mean, for example, a device such as a PROM, EPROM, EEPROM, Flash PROM, compactflash, smartmedia, and the like.

In the illustrated embodiment of FIG. 5A, read orientation image 531 (FIGS. 5A, 7), tangential read threshold correlation factor 532 (FIGS. 5A, 7), tangential read matched filter 533 (FIGS. 5A, 7), first rotated read threshold correlation factor 534 (FIGS. 5A, 7), first rotated read matched filter 535 (FIGS. 5A, 7), second rotated read threshold correlation factor 536 (FIGS. 5A, 7), second rotated read matched filter 537 (FIGS. 5A, 7), RES calibration test protocol 538 (FIGS. 5A, 7), and RES operational parameters and nominal ranges 539 (FIGS. 5A, 7), are written to memory 530.

FIG. 7 illustrates one embodiment of Applicants' holographic data storage and retrieval system 700. In the illustrated embodiment of FIG. 7, holographic data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic encoding/decoding systems. In the illustrated embodiment of FIG. 7, holographic data storage and retrieval system 700 comprises a first holographic encoding/decoding system 100 (FIGS. 1A, 1B, 4A, 4B), shown as system 10A, and a second holographic encoding/decoding system 100, shown as system 100B.

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, memory 768, processor 764, and data caches 766 and 767, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like. In certain embodiments, memory 768 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into a convolution encoded data images. Those data images are transferred to an RSLM 110 (FIGS. 1A, 2A, 3, 4A, 4B) disposed in one or more of holographic encoding/decoding systems 100A and/or 100B.

In certain embodiments, holographic encoding/decoding systems 100A and 100B are located in different geographical places. In certain embodiments, storage controller 760 distributes information between two or more holographic encoding/decoding systems in order to protect the information.

Figure 8:
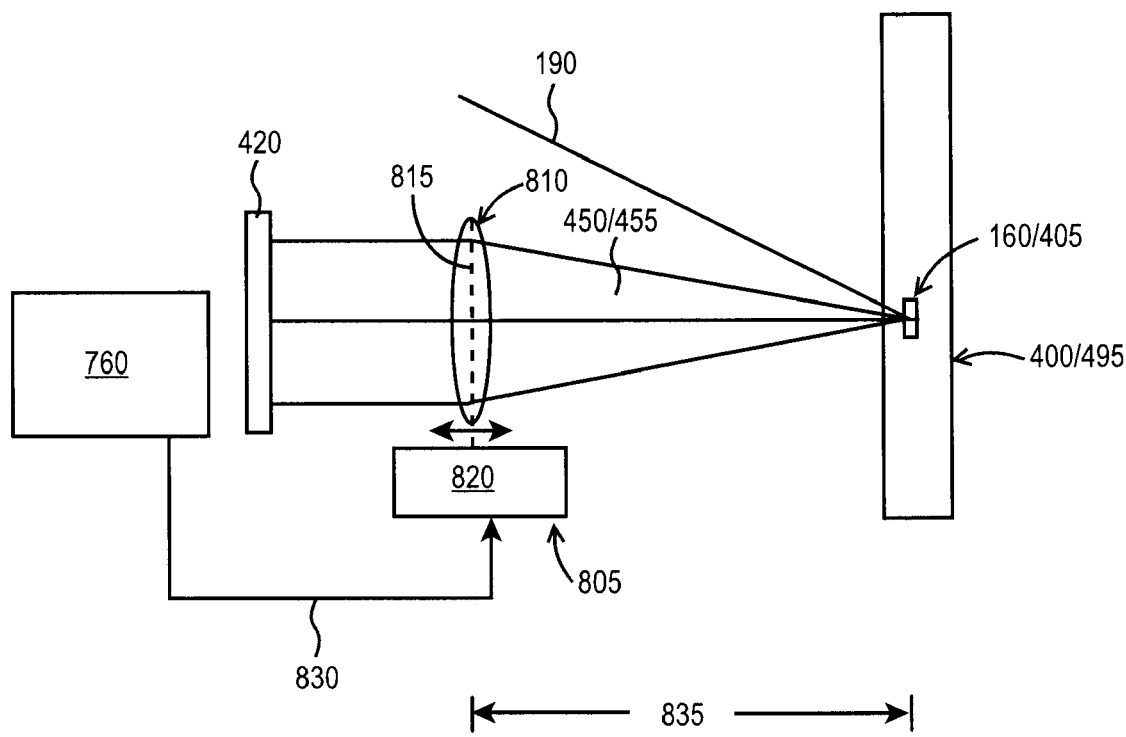
FIG. 8 shows a moveable imaging lens assembly used to direct a reconstructed image onto an optical detector.
Figure 9:
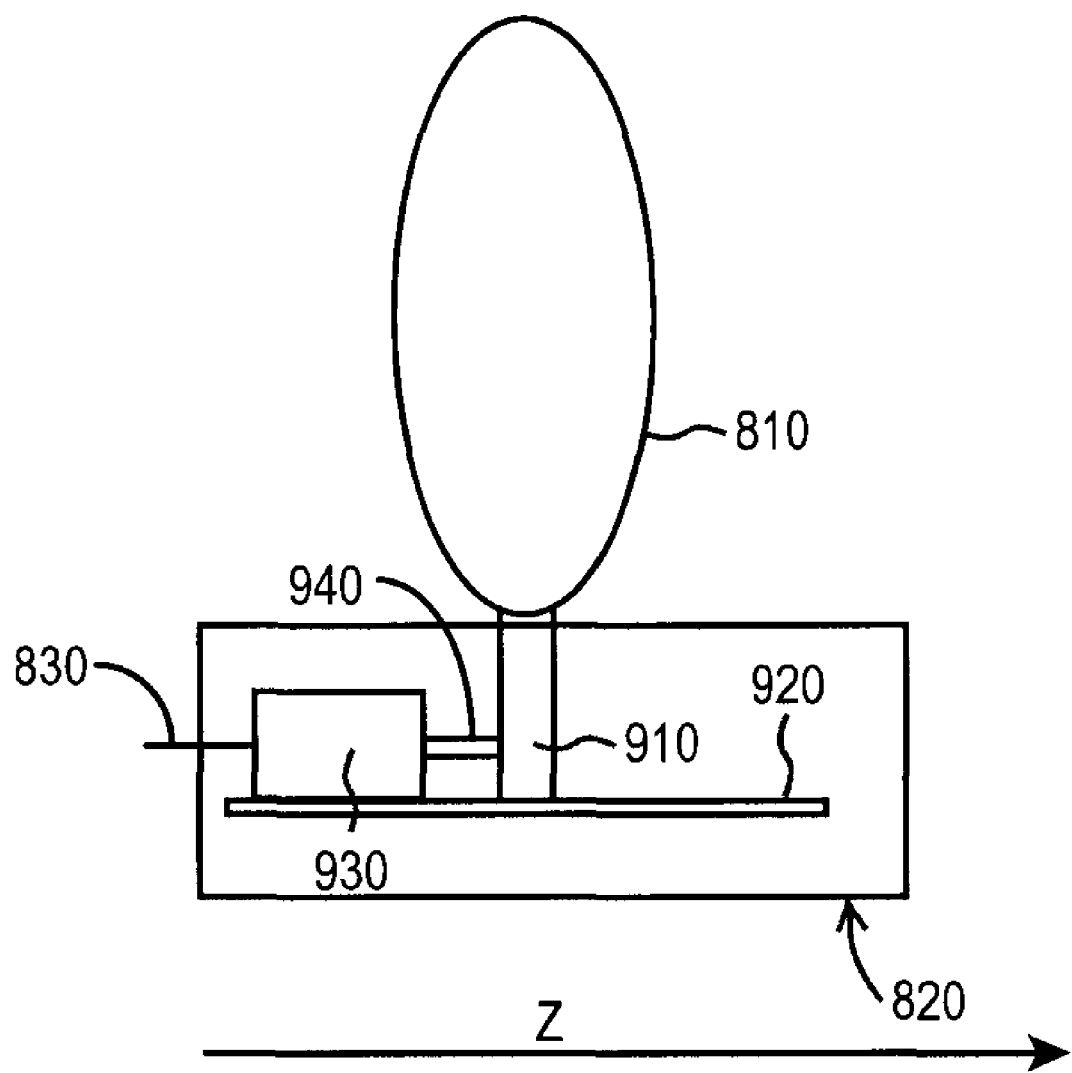
FIG. 9 shows one embodiment of the moveable imaging lens assembly of FIG. 8.

In certain embodiments, holographic data storage system 100 further comprises a moveable focusing lens assembly disposed between an encoded holographic data storage medium and the input screen 420 element of optical detector 410 (FIGS. 1A, 1B, 4A, 4B, 5A and 6). Referring now to FIGS. 8 and 9, moveable imaging lens assembly 805 comprises imaging lens 810 is moveably disposed on solenoid assembly 820. In the illustrated embodiment of FIG. 8, moveable imaging lens assembly 805 is in communication with storage controller 760 via communication link 830.

In the illustrated embodiment of FIG. 9, solenoid assembly 820 comprises solenoid 930, armature 940 which extends outwardly from solenoid, moveable support member 910 which is attached to the distal end of armature 940, wherein support member 910 is bidirectionally moveably disposed along track 920. In response to first input signals from storage controller 760, solenoid 930 causes armature 940 to retract thereby moving support member 910 and imaging lens 810 away from the encoded holographic data storage medium, i.e. distance 835 (FIG. 8) increases, wherein distance 835 comprises the distance between lens centerline 815 and the encoded hologram. Alternatively, in response to second input signals from storage controller 760, solenoid 930 causes armature 940 to extend thereby moving support member 910 and imaging lens 810 toward holographic data storage medium 100, i.e. distance 835 decreases.

Applicants' invention comprises a method to optimize the performance of a holographic data storage system, wherein said holographic data storage system comprises a plurality of calibratable components, wherein each of said plurality of calibratable components comprises one or more operational parameters, and wherein each operational parameter is associated with a nominal range. In certain embodiments, such calibratable components comprise one or more servo elements. In certain embodiments, such calibratable components comprise one or more solenoid elements. In certain embodiments, such calibratable components comprise one or more matched filter elements.

Applicants' method determines if the one or more operational parameters associated with each of the calibratable components fall within the associated nominal range. If an operational parameter associated with a selected calibratable component falls outside the associated nominal range, Applicants' method recalibrates that selected calibratable component.

Figures 15, 15A:
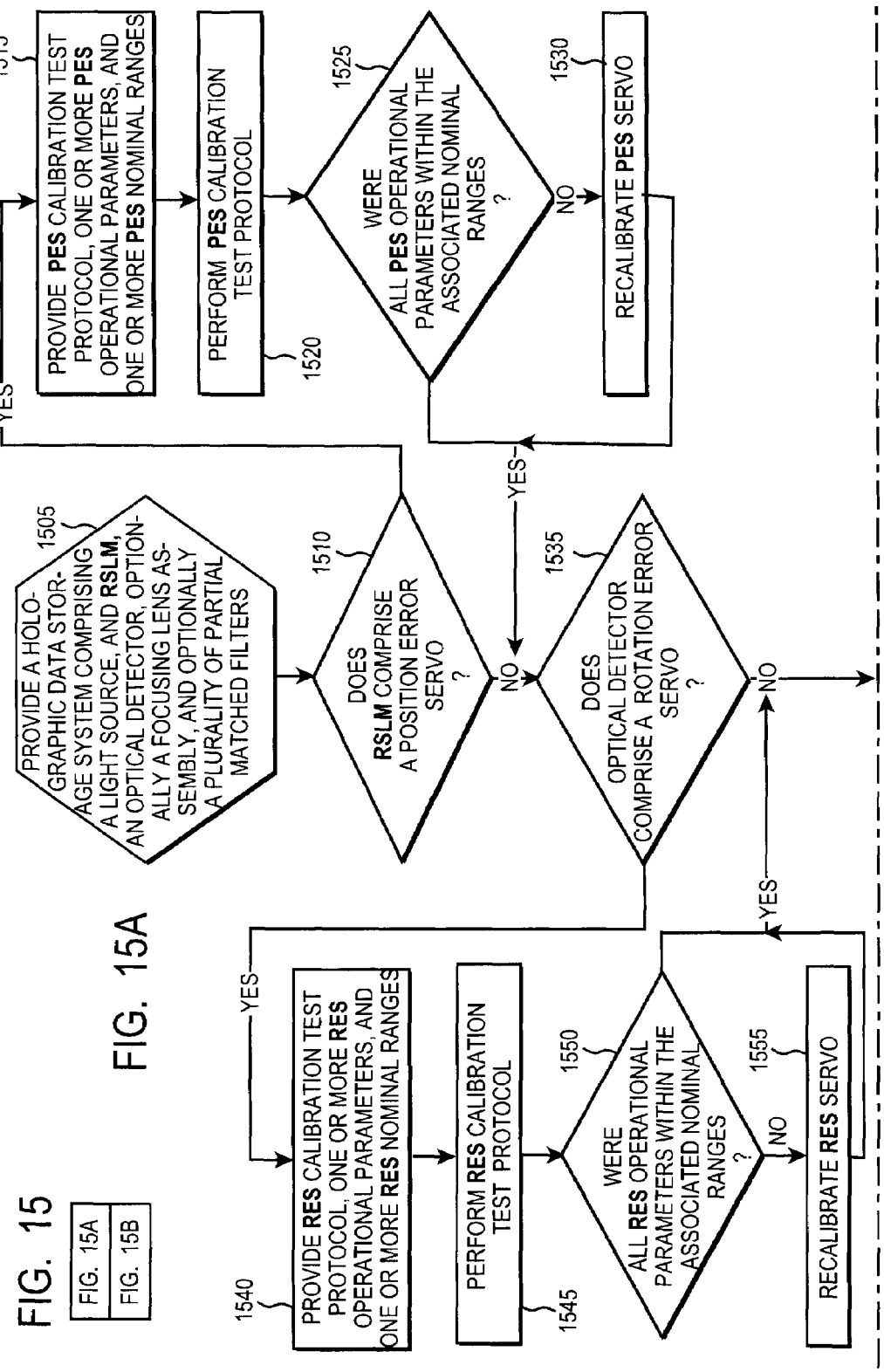
FIG. 15A is a flow chart summarizing the steps of Applicants' method to check the calibration of one or more servos and/or solenoids.

Referring now to FIG. 15A, in step 1505 Applicants' method provides a holographic data storage system, such as for example Applicants' holographic data storage system 100 (FIGS. 1A, 1B, 4A, 4B), comprising a light source, a spatial light modulator, an optical detector, optionally a moveable focusing lens assembly, and optionally a plurality of matched filters. In certain embodiments, Applicants' holographic data storage system comprises a storage controller, such as and without limitation, storage controller 760 (FIG. 7).

In step 1510 Applicants' method determines if the holographic data storage system of step 1505 comprises a spatial light modulator ("SLM") comprising a Position Error Servo ("PES"). In certain embodiments, step 1510 is performed by a storage controller, such as storage controller 760 (FIG. 7). In certain embodiments, step 1510 is performed by a host computer in communication with the holographic data storage system.

If the method determines in step 1510 that the holographic data storage system comprises a spatial light modulator comprising a Position Error Servo, then the method transitions from step 1510 to step 1515 wherein the method provides a PES calibration test protocol, one or more PES operational parameters, and a PES nominal range associated with each PES operational parameter. In certain embodiments, the PES operational parameters comprise one or more PES orientation signals. The PES test protocol inputs seriatim the one or more PES orientation signals on signal input line 214 (FIG. 2A), and determines the rotation of screen 120 (FIGS. 1A, 1B, 2A, 3) resulting from each of those PES orientation signals. The method further associates a nominal rotation range with each one of the PES orientation signals.

In certain embodiments, the PES calibration test protocol, one or more PES operational parameters, and PES nominal ranges, are provided by the manufacturer of the SLM. In certain embodiments, the one or more threshold PES calibration levels are provided by the manufacturer of the PES. In certain embodiments, the PES calibration test protocol, one or more PES operational parameters, and PES nominal ranges, are provided by one or more host computers in communication with the holographic data storage system. In certain embodiments, the PES test calibration protocol is stored in memory 230 (FIG. 2A) and/or memory 763 (FIG. 7) as PES calibration test protocol 238, and the one or more PES operational parameters and PES nominal ranges are stored as PES operational parameters/nominal ranges 239.

In step 1520, the method performs the PES calibration test protocol of step 1515. In certain embodiments, the method inputs the one or more PES orientation signals, and determines the resulting rotation(s) of the SLM. In certain embodiments, step 1520 is performed by a storage controller, such as storage controller 760 (FIG. 7). In certain embodiments, step 1520 is performed by SLM controller 210 (FIG. 2A). In certain embodiments, step 1520 is performed by a host computer in communication with the holographic data storage system.

In step 1525, the method determines if all PES operation parameters, i.e. rotations, fell within the associated nominal ranges during the PES calibration test of step 1520. In certain embodiments, step 1525 is performed by a storage controller, such as storage controller 760 (FIG. 7). In certain embodiments, step 1525 is performed by SLM controller 210 (FIG. 2A). In certain embodiments, step 1525 is performed by a host computer in communication with the holographic data storage system.

If the method determines in step 1525 that all PES operation parameters fell within the associated nominal ranges during the PES calibration test of step 1520, then the method transitions from step 1525 to step 1535. Alternatively, if all PES operation parameters did not fall within the associated nominal ranges during the PES calibration test of step 1520, then the method transitions from step 1525 to step 1530 wherein the method recalibrates the PES servo. The method transitions from step 1530 to step 1535.

In certain embodiments, step 1530 further comprises providing an alert message specifying that the PES servo should be recalibrated. In certain embodiments, step 1530 further comprises displaying that alert message on a visual display device.

In certain embodiments, step 1530 is performed by the owner and/or operator of the holographic data storage system. In certain embodiments, step 1530 is performed by the manufacturer of the PES. In certain embodiments, step 1530 is performed by the owner and/or operator of a host computer in communication with the holographic data storage system.

In step 1535, the method determines if the holographic data storage system of step 1505 comprises an optical detector comprising a Rotational Error Servo ("RES"). In certain embodiments, step 1535 is performed by a storage controller, such as storage controller 760 (FIG. 7). In certain embodiments, step 1535 is performed by a host computer in communication with the holographic data storage system.

If the method determines in step 1535 that the holographic data storage system comprises an optical detector comprising a Rotational Error Servo ("RES"), then the method transitions from step 1535 to step 1540 wherein the method provides a RES calibration test protocol, one or more RES operational parameters, and a RES nominal range associated with each RES operational parameter. In certain embodiments, the RES operational parameters comprise one or more RES orientation signals. The RES test protocol inputs seriatim the one or more RES orientation signals on signal input line 514, and determines the rotation of screen 420 resulting from each of those RES orientation signals. The method further associates a nominal rotation range with each one of the RES orientation signals.

In certain embodiments, the RES calibration test protocol, one or more RES operational parameters, and RES nominal ranges, are provided by the manufacturer of the SLM. In certain embodiments, the one or more threshold RES calibration levels are provided by the manufacturer of the RES. In certain embodiments, the RES calibration test protocol, one or more RES operational parameters, and RES nominal ranges, are provided by one or more host computers in communication with the holographic data storage system. In certain embodiments, the RES test calibration protocol is stored in memory 530 (FIG. 5A) and/or memory 768 (FIG. 7) as RES calibration test protocol 538, and the one or more RES operational parameters and RES nominal ranges are stored as RES operational parameters/nominal ranges 539.

In step 1545, the method performs the RES calibration test protocol of step 1540. In certain embodiments, the method inputs the one or more RES orientation signals, and determines the resulting rotation(s) of input screen 520 element of optical detector 510. In certain embodiments, step 1545 is performed by a storage controller, such as storage controller 760 (FIG. 7). In certain embodiments, step 1545 is performed by optical detector controller 510 (FIG. 5A). In certain embodiments, step 1545 is performed by a host computer in communication with the holographic data storage system.

In step 1550, the method determines if all RES operation parameters, i.e. rotations, fell within the associated nominal ranges during the RES calibration test of step 1540. In certain embodiments, step 1550 is performed by a storage controller, such as storage controller 760 (FIG. 7). In certain embodiments, step 1550 is performed by optical detector controller 510 (FIG. 5A). In certain embodiments, step 1550 is performed by a host computer in communication with the holographic data storage system.

If the method determines in step 1550 that all RES operation parameters fell within the associated nominal ranges during the RES calibration test of step 1545, then the method transitions from step 1550 to step 1560. Alternatively, if all RES operation parameters did not fall within the associated nominal ranges during the RES calibration test of step 1545, then the method transitions from step 1550 to step 1555 wherein the method recalibrates the RES servo. The method transitions from step 1555 to step 1560.

In certain embodiments, step 1555 further comprises providing an alert message specifying that the RES servo should be recalibrated. In certain embodiments, step 1555 further comprises displaying that alert message on a visual display device.

In certain embodiments, step 1555 is performed by the owner and/or operator of the holographic data storage system. In certain embodiments, step 1555 is performed by the manufacturer of the RES. In certain embodiments, step 1555 is performed by the owner and/or operator of a host computer in communication with the holographic data storage system.

If the method determines in step 1560 that the holographic data storage system comprises a moveable imaging lens assembly ("MILA"), then the method transitions from step 1560 to step 1565 wherein the method provides a MILA calibration test protocol, one or more MILA operational parameters, and a MILA nominal range associated with each MILA operational parameter. In certain embodiments, the MILA operational parameters comprise one or more MILA orientation signals. The MILA test protocol inputs seriatim the one or more MILA orientation signals on communication link 830, and determines the movement of lens 810 (FIGS. 8, 9) resulting from each of those MILA orientation signals. The method further associates a nominal translational range with each one of the MILA orientation signals.

In certain embodiments, the MILA calibration test protocol, one or more MILA operational parameters, and MILA nominal ranges, are provided by the manufacturer of the SLM. In certain embodiments, the one or more threshold MILA calibration levels are provided by the manufacturer of the MILA. In certain embodiments, the MILA calibration test protocol, one or more MILA operational parameters, and MILA nominal ranges, are provided by one or more host computers in communication with the holographic data storage system.

In step 1570, the method performs the MILA calibration test protocol of step 1565. In certain embodiments, the method inputs the one or more MILA orientation signals, and determines the resulting translational movement of imaging lens 810 along the Z axis shown in FIG. 9. In certain embodiments, step 1570 is performed by a storage controller, such as storage controller 760 (FIG. 7). In certain embodiments, step 1570 is performed by a host computer in communication with the holographic data storage system.

In step 1575, the method determines if all MILA operation parameters, i.e. distances 835 (FIG. 8), fell within the associated nominal ranges during the MILA calibration test of step 1570. In certain embodiments, step 1575 is performed by a storage controller, such as storage controller 760 (FIG. 7). In certain embodiments, step 1575 is performed by a host computer in communication with the holographic data storage system.

If the method determines in step 1575 that all MILA operation parameters fell within the associated nominal ranges during the MILA calibration test of step 1570, then the method transitions from step 1575 to step 1585. Alternatively, if all MILA operation parameters did not fall within the associated nominal ranges during the MILA calibration test of step 1570, then the method transitions from step 1575 to step 1580 wherein the method recalibrates solenoid 930 (FIG. 9). The method transitions from step 1580 to step 1585.

In certain embodiments, step 1580 further comprises providing an alert message specifying that the MILA should be recalibrated. In certain embodiments, step 1580 further comprises displaying that alert message on a visual display device.

In certain embodiments, step 1580 is performed by the owner and/or operator of the holographic data storage system. In certain embodiments, step 1580 is performed by the manufacturer of the MILA. In certain embodiments, step 1580 is performed by the owner and/or operator of a host computer in communication with the holographic data storage system.

In step 1585, the method determines whether to check the calibration of a set of read channel matched filters. In certain embodiments, step 1585 is performed by the owner and/or operator of the holographic data storage system. In certain embodiments, step 1585 is performed by a storage controller, such as storage controller 760 (FIG. 7).

If the method elects in step 1585 not to check the calibration of a set of read channel matched filters, the method transitions from step 1585 to step 1590. Alternatively, if the method elects in step 1585 to check the calibration of a set of read channel matched filters, the method transitions from step 1585 to step 1010 (FIG. 10).

Figure 10:
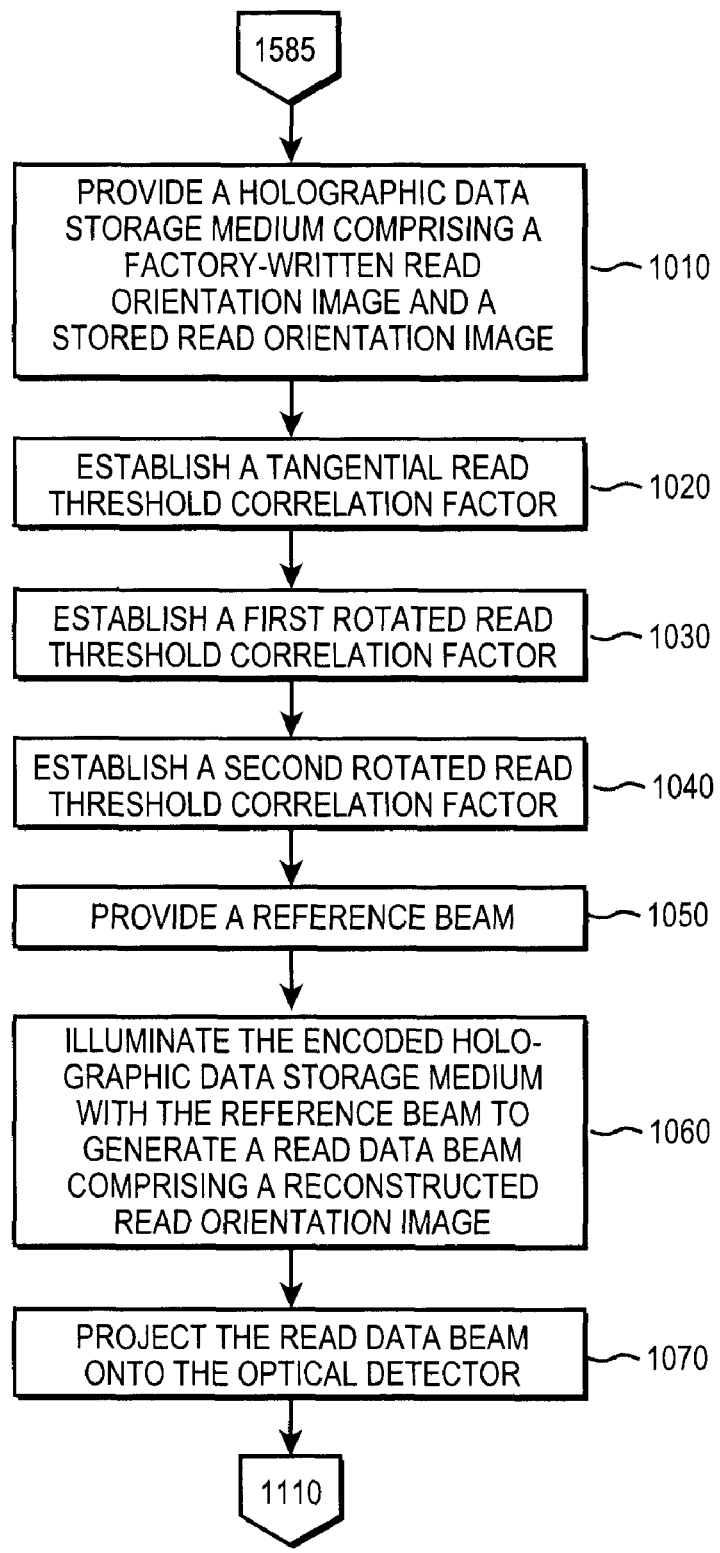
FIG. 10 is a flow chart summarizing the initial steps of Applicants' method to check the calibration of a plurality of read matched filters.

Referring now to FIG. 10, in step 1010 the method provides an encoded holographic data storage medium, such as encoded holographic data storage medium 400 (FIG. 4B) comprising an encoded read orientation image, such as encoded read orientation image 405 (FIG. 4B). In certain embodiments, encoded read orientation image 405 is integrally formed in holographic data storage medium 400 at the time of manufacture. In other embodiments, read orientation image 405 is encoded in holographic data storage medium 400 using a precision holographic data recording apparatus operated by the manufacturer of holographic data storage medium 400.

In step 1020, Applicants' method establishes a tangential read threshold correlation factor 532 (FIGS. 5A, 7). In certain embodiments, the tangential read threshold correlation factor of step 1020 is set by the owner and/or operator of the holographic data storage system of step 1505. In certain embodiments, the tangential read threshold correlation factor of step 1020 is set by one or more computing systems, such as one or more of computing systems 710 (FIG. 7), 720 (FIG. 7), and/or 730 (FIG. 7).

In step 1030, Applicants' method establishes a first rotated read threshold correlation factor 534 (FIGS. 5A, 7). In certain embodiments, the first rotated read threshold correlation factor of step 1030 is set by the owner and/or operator of the holographic data storage system of step 1505. In certain embodiments, the first rotated read threshold correlation factor of step 1030 is set by one or more computing systems, such as one or more of computing systems 710 (FIG. 7), 720 (FIG. 7), and/or 730 (FIG. 7).

In step 1040, Applicants' method establishes a second rotated read threshold correlation factor 536 (FIGS. 5A, 7). In certain embodiments, the second rotated read threshold correlation factor of step 1040 is set by the owner and/or operator of the holographic data storage system of step 1505. In certain embodiments, the second rotated read threshold correlation factor of step 1040 is set by one or more computing systems, such as one or more of computing systems 710 (FIG. 7), 720 (FIG. 7), and/or 730 (FIG. 7).

In step 1050, the method provides a reference beam, such as reference beam 190 (FIGS. 1A, 4A, 4B). In step 1060, the method illuminates the holographic data storage medium of step 1010 with the reference beam of step 1050 to generate a read data beam, such as read data beam 455 (FIG. 4B), wherein that read data beam comprises a reconstructed read orientation image, such as reconstructed read orientation image 435 (FIG. 4B).

In step 1070, the method projects the read data beam of step 1060 onto an optical detector, such as optical detector 410 (FIGS. 1A, 1B, 4A, 4B, 5A, 6), such that the reconstructed read orientation image 435 is disposed on the input screen portion of the optical detector, such as input screen 420 (FIGS. 4A, 4B, 5A, 6,) of optical detector 410 (FIGS. 1A, 1B, 4A, 4B, 5A, 6).

Figure 16:
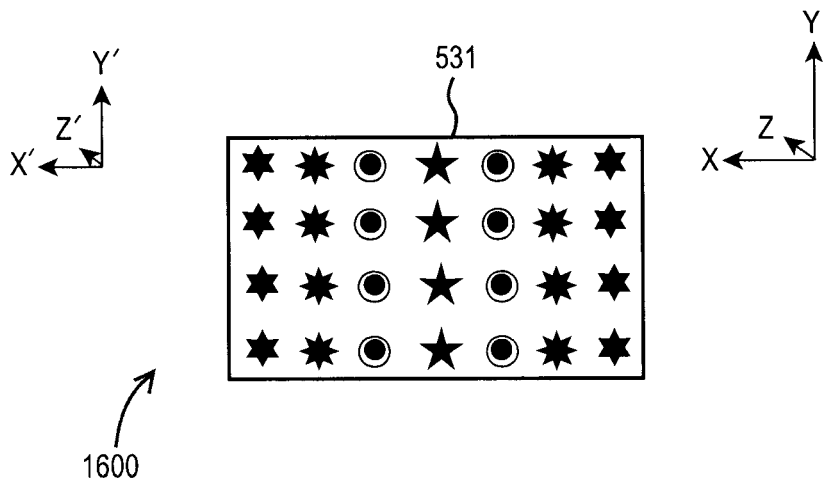
FIG. 16 shows one embodiment of a reconstructed read orientation image as seen through a tangential read matched filter.

The method transitions from step 1070 to step 1110 (FIG. 11A). Referring now to FIG. 11A, in step 1110 the method determines a tangential read correlation factor using the reconstructed read orientation image of step 1060, a stored read orientation image, such as stored read orientation image 531 (FIGS. 5A, 7), and a tangential matched filter, such as for example Applicants' tangential read matched filter 533 (FIGS. 5A, 7). Referring now to FIG. 16, image 1600 comprises stored read orientation image 531 (FIGS. 5A, 7) as seen through Applicants' tangential read matched filter 533 (FIGS. 5A, 7), wherein the X' axis of image 1600 is parallel to the X axis of optical detector 410 (FIGS. 1A, 1B, 4A, 4B, 5A, 6), and wherein the Y' axis of image 1600 is parallel to the Y axis of optical detector 410 (FIGS. 1A, 1B, 4A, 4B, 5A, 6), and wherein the Z' axis of image 1600 is parallel to the Z axis of optical detector 410 (FIGS. 1A, 1B, 4A, 4B, 5A, 6).

In certain embodiments, step 1110 is performed by Applicants' optical detector controller 510 (FIG. 5A). In certain embodiments, step 1110 is performed by Applicants' SLM controller 210 (FIG. 2A). In certain embodiments, step 1110 is performed by Applicants' storage controller 760 (FIG. 7). In certain embodiments, step 1110 is performed by a host computer in communication with Applicants' holographic data storage system 100. In certain embodiments, step 1110 is performed by a host computer in communication with Applicants' holographic data storage and retrieval system 700.

In certain embodiments, in step 1110 Applicants' method calculates the difference between the reconstructed read orientation image $g(x,y)$ and impulse response $h(x,y)=s^*(-x,-y)$ of image 1600 (FIG. 16). Referring now to Equation (1), $V(x,y)$ comprises the cross-correlation between the reconstructed read orientation image and $s(x,y)$ for image 1600. As those skilled in the art will appreciate, Equation (1) comprises a double integral, meaning that the integration is over the X axis and Y axis directions of the input screen portion of the optical detector. Additionally, $\xi$ is the integration variable along that X axis, $\eta$ is the integration variable along that Y axis, and * denotes a complex conjugate.

$$V(x,y)=\iint g(\xi,\eta)s^*(\xi-x,\eta-y)d\xi d\eta \quad (1)$$

Mathematically, $V(x,y)$ comprises a surface varying along the X axis and the Y axis, for each $(x,y)$. There is one value of $V(x,y)$ for each detector element in input screen 520. In certain embodiments, the range $V(x,y)$ for each $(x,y)$ is between $-1$ and $+1$, wherein $+1$ represents the ideal correlation of one hundred (100%). To maximize $V(x,y)$, the following difference surface, Difference $(x,y)$, is defined in Equation (2).

$$\text{Difference}(x,y)=1-V(x,y) \quad (2)$$

Difference$(x,y)$ is calculated by subtracting the matched filter correlation $V(x,y)$ from unity. In certain embodiments, Difference$(x,y)$ is evaluated point-to-point. In certain embodiments, Difference$(x,y)$ is evaluated as an arithmetic mean. In certain embodiments, Difference$(x,y)$ is evaluated as a geometric mean. In certain embodiments, Difference$(x,y)$ is evaluated as a root-mean-square. In certain embodiments, Difference$(x,y)$ ranges between 0 and +2, wherein the ideal difference for each value of $(x,y)$ is 0, meaning for a value of 0 that there is no difference between the reconstructed orientation image and the orientation image at that point $(x,y)$.

In certain embodiments, Difference$(x,y)$ is evaluated point-by-point. In other embodiments, Applicants have found it advantageous to quantify surface Difference$(x,y)$ in terms of a single number, i.e. a correlation factor. In certain embodiments, the tangential read correlation factor of step 1110, and/or the first rotated read correlation factor of step 1120, and/or the second rotated read correlation factor of step 1130, comprises a MAX_Difference which is equal to the maximum value of Difference$(x,y)$. In other embodiments, the tangential read correlation factor of step 1110, and/or the first rotated read correlation factor of step 1120, and/or the second rotated read correlation factor of step 1130, comprises an AM_Difference comprising the arithmetic mean of the values of Difference(x,y). In still other embodiments, the tangential read correlation factor of step 1110, and/or the first rotated read correlation factor of step 1120, and/or the second rotated read correlation factor of step 1130, comprises a GM_Difference comprising the geometric mean of the values of Difference(x,y). In yet other embodiments, the tangential read correlation factor of step 1110, and/or the first rotated read correlation factor of step 1120, and/or the second rotated read correlation factor of step 1130, comprises an RMS_Difference comprising the root-mean-square of the values of Difference(x,y).

Figure 17A:
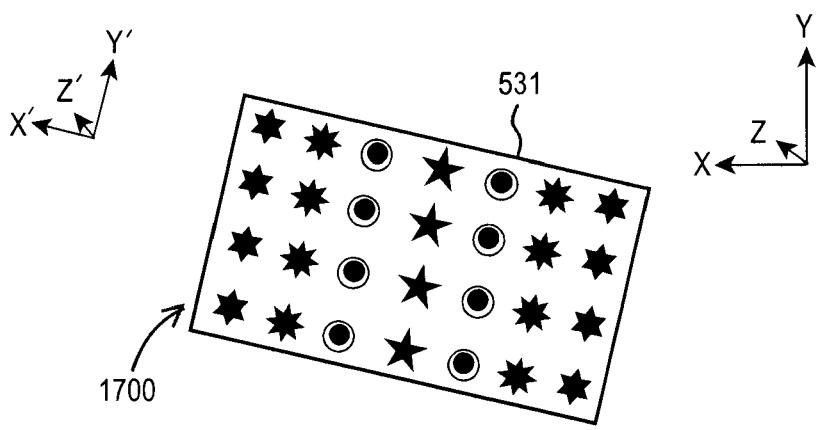
FIG. 17A shows one embodiment of a reconstructed read orientation image as seen through a first rotated read matched filter.

In step 1120, the method determines a first rotated read correlation factor using the reconstructed read orientation image of step 1060 (FIG. 10), the stored read orientation image 531 (FIGS. 5A, 7), and a first rotated matched filter, such as Applicants' first rotated read matched filter 535 (FIGS. 5A, 7). Referring now to FIG. 17A, image 1700 comprises read orientation image 531 as seen through Applicants' first rotated read matched filter, wherein neither the X' axis nor the Y' axis of image 1700 is parallel to the X axis of the optical detector, but wherein the Z' axis of image 1700 is parallel to the Z axis of the optical detector.

The X' axis of image 1700 is rotated in a first direction from the X axis of the optical detector about the Z axis. In certain embodiments, the X' axis of image 1700 is rotated about the Z axis an increment of up to about one degree in a first direction from the X axis of the optical detector. In certain embodiments, the second read correlation factor of step 1120 is calculated using Equations (1) and (2) as described hereinabove.

In certain embodiments, step 1120 is performed by Applicants' optical detector controller 510 (FIG. 5A). In certain embodiments, step 1120 is performed by Applicants' SLM controller 210 (FIG. 2A). In certain embodiments, step 1120 is performed by Applicants' storage controller 760 (FIG. 7). In certain embodiments, step 1120 is performed by a host computer in communication with Applicants' holographic data storage system 100. In certain embodiments, step 1120 is performed by a host computer in communication with Applicants' holographic data storage and retrieval system 700.

Figure 17B:
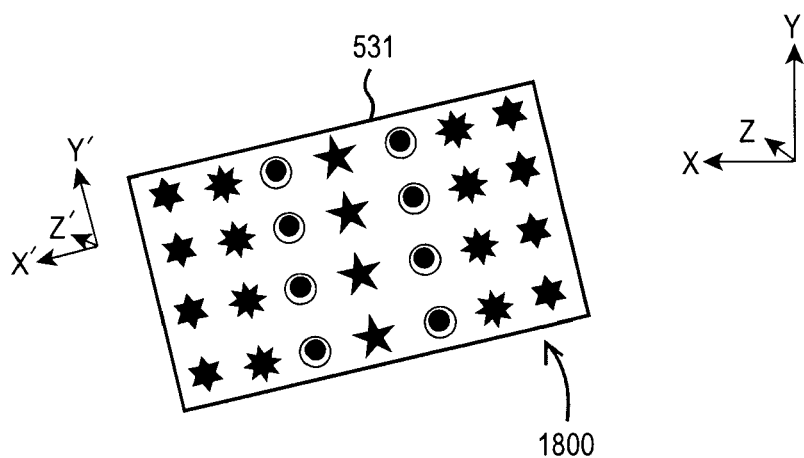
FIG. 17B shows one embodiment of a reconstructed read orientation image as seen through a second rotated read matched filter.

In step 1130, the method determines a second rotated correlation factor using the reconstructed read orientation image of step 1060 (FIG. 10), the stored read orientation image 531 (FIGS. 5A, 7), and a second rotated read matched filter, such as Applicants' second rotated matched filter 537 (FIGS. 5A, 7). Referring now to FIG. 17B, image 1800 comprises image 531 as seen through Applicants' second rotated matched filter, wherein neither the X' axis nor the Y' axis of image 1800 is parallel to the X axis of the optical detector, but wherein the Z' axis of image 1800 is parallel to the Z axis of the optical detector.

The X axis of the image 1800 is rotated in a second direction from the X axis of the optical detector about the Z axis. In certain embodiments, the X' axis of image 1800 is rotated about the Z axis an increment of up to about one degree in the second direction from the X axis of the optical detector. In certain embodiments, the third read correlation factor of step 1120 is calculated using Equations (1) and (2) as described hereinabove.

In certain embodiments, step 1130 is performed by Applicants' optical detector controller 510 (FIG. 5A). In certain embodiments, step 1130 is performed by Applicants' SLM controller 210 (FIG. 2A). In certain embodiments, step 1130 is performed by Applicants' storage controller 760 (FIG. 7).

In certain embodiments, step 1130 is performed by a host computer in communication with Applicants' holographic data storage system 100. In certain embodiments, step 1130 is performed by a host computer in communication with Applicants' holographic data storage and retrieval system 700.

In step 1140, the method determines if the tangential read correlation factor of step 1110 is greater than or equal to the tangential read threshold correlation factor 532 (FIGS. 5A, 7) set in step 1020 (FIG. 10). In certain embodiments, step 1140 is performed by Applicants' optical detector controller 510 (FIG. 5A). In certain embodiments, step 1140 is performed by Applicants' SLM controller 210 (FIG. 2A). In certain embodiments, step 1140 is performed by Applicants' storage controller 760 (FIG. 7). In certain embodiments, step 1140 is performed by a host computer in communication with Applicants' holographic data storage system 100. In certain embodiments, step 1140 is performed by a host computer in communication with Applicants' holographic data storage and retrieval system 700.

If the method determines in step 1140 that the tangential read correlation factor of step 1110 is greater than or equal to the tangential read threshold correlation factor of step 1020 (FIG. 10), then the method transitions from step 1140 to step 1160. Alternatively, if the method determines in step 1140 that the tangential read correlation factor of step 1110 is not greater than or equal to the tangential read threshold correlation factor of step 1020 (FIG. 10), then the method transitions from step 1140 to step 1150 wherein the method recalibrates the tangential read matched filter, and saves that new tangential read matched filter as tangential read matched filter 532. In certain embodiments, step 1150 further comprises providing an alert message specifying that the tangential read matched filter should be recalibrated. In certain embodiments, step 1150 further comprises displaying that alert message on a visual display device. In certain embodiments, step 1150 is performed by the owner and/or operator of the holographic data storage system of step 1505 (FIG. 15A).

The method transitions from step 1150 to step 1160 wherein the method determines if the first rotated read correlation factor of step 1120 is greater than or equal to the first rotated read threshold correlation factor 534 (FIGS. 5A, 7) set in step 1030 (FIG. 10). In certain embodiments, step 1160 is performed by Applicants' optical detector controller 510 (FIG. 5A). In certain embodiments, step 1160 is performed by Applicants' SLM controller 210 (FIG. 2A). In certain embodiments, step 1160 is performed by Applicants' storage controller 760 (FIG. 7). In certain embodiments, step 1160 is performed by a host computer in communication with Applicants' holographic data storage system 100. In certain embodiments, step 1160 is performed by a host computer in communication with Applicants' holographic data storage and retrieval system 700.

If the method determines in step 1160 that the first rotated read correlation factor of step 1120 is greater than or equal to the second rotated read threshold correlation factor of step 1030 (FIG. 10), then the method transitions from step 1160 to step 1180. Alternatively, if the method determines in step 1160 that the first rotated read correlation factor of step 1120 is not greater than or equal to the tangential read threshold correlation factor of step 1030 (FIG. 10), then the method transitions from step 1160 to step 1170 wherein the method recalibrates the first rotated read matched filter, and saves that new first rotated read matched filter as first rotated read matched filer 534. (FIGS. 5A, 7) In certain embodiments, step 1170 further comprises providing an alert message specifying that the first rotated read matched filter should be recalibrated. In certain embodiments, step 1170 further comprises displaying that alert message on a visual display device. In certain embodiments, step 1170 is performed by the owner and/or operator of the holographic data storage system of step 1505 (FIG. 15A).

The method transitions from step 1170 to step 1180 wherein the method determines if the second rotated read correlation factor of step 1130 is greater than or equal to the second rotated read threshold correlation factor 536 (FIGS. 5A, 7) set in step 1040 (FIG. 10). In certain embodiments, step 1180 is performed by Applicants' optical detector controller 510 (FIG. 5A). In certain embodiments, step 1180 is performed by Applicants' SLM controller 210 (FIG. 2A). In certain embodiments, step 1180 is performed by Applicants' storage controller 760 (FIG. 7). In certain embodiments, step 1180 is performed by a host computer in communication with Applicants' holographic data storage system 100. In certain embodiments, step 1180 is performed by a host computer in communication with Applicants' holographic data storage and retrieval system 700.

If the method determines in step 1180 that the second rotated read correlation factor of step 1130 is greater than or equal to the second rotated read threshold correlation factor of step 1040 (FIG. 10), then the method transitions from step 1180 to step 1590. Alternatively, if the method determines in step 1180 that the second rotated read correlation factor of step 1130 is not greater than or equal to the second rotated read threshold correlation factor of step 1040 (FIG. 10), then the method transitions from step 1180 to step 1190 wherein the method recalibrates the second rotated read matched filter, and saves that new second rotated read matched filter as second rotated read matched filter 536 (FIGS. 5A, 7). In certain embodiments, step 1190 further comprises providing an alert message specifying that the second rotated read matched filter should be recalibrated. In certain embodiments, step 1190 further comprises displaying that alert message on a visual display device. In certain embodiments, step 1190 is performed by the owner and/or operator of the holographic data storage system of step 1505 (FIG. 15A).

The method transitions from step 1190 to step 1590 wherein the method determines whether to check the calibration of a set of write matched filters. In certain embodiments, step 1590 is performed by the owner and/or operator of the holographic data storage system. In certain embodiments, step 1590 is performed by a storage controller, such as storage controller 760 (FIG. 7).

If the method elects in step 1590 not to check the calibration of a set of write matched filters, the method transitions from step 1590 to step 1595 and ends. Alternatively, if the method elects in step 1590 to check the calibration of a set of write matched filters, the method transitions from step 1590 to step 1810 (FIG. 18).

Figure 18:
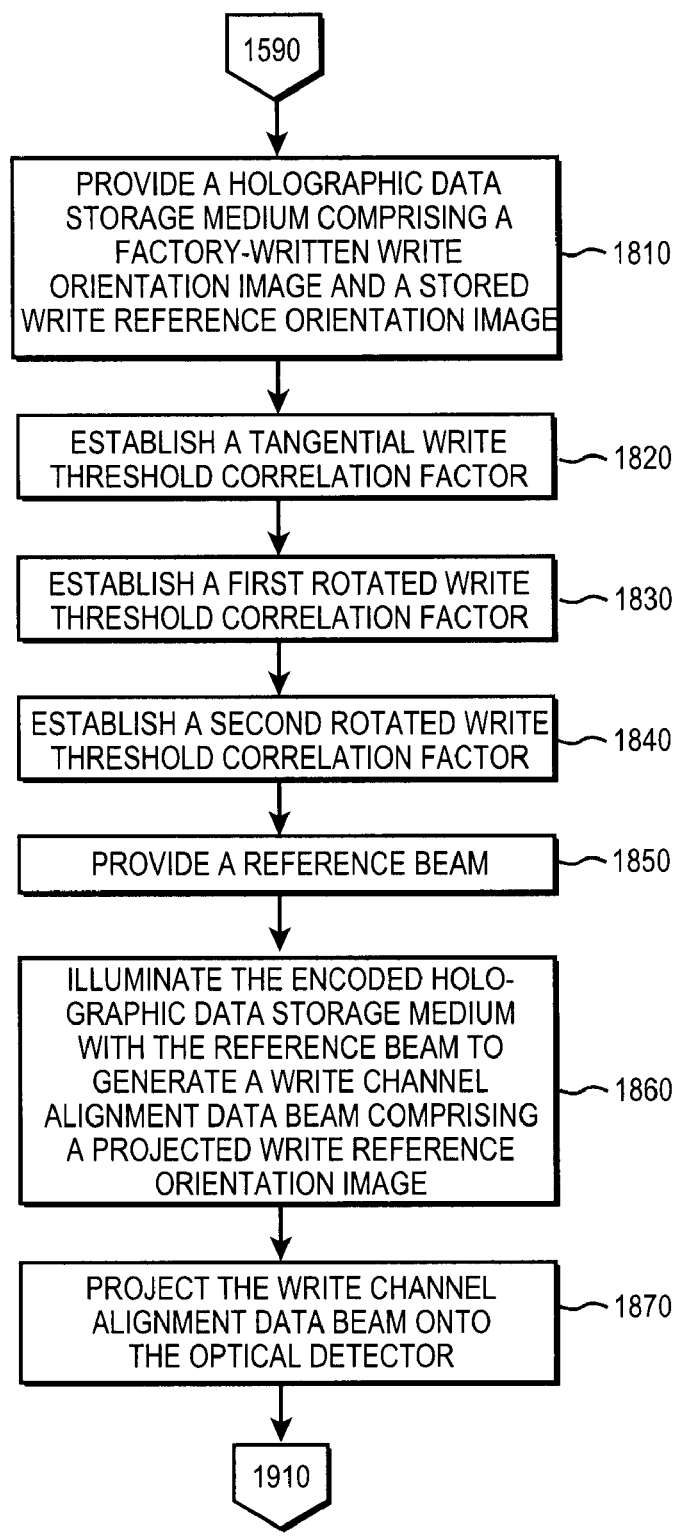
FIG. 18 is a flow chart summarizing the initial steps of Applicants' method to check the calibration of a plurality of write matched filters.

Referring now to FIG. 18, in step 1810 the method provides an encoded holographic data storage medium, such as encoded holographic data storage medium 495 (FIG. 4A) comprising an encoded write orientation image, such as encoded write orientation image 160 (FIG. 4A). In certain embodiments, encoded write orientation image 160 is integrally formed at the time of manufacture in holographic data storage medium 400. In other embodiments, write orientation image 160 is encoded in holographic data storage medium 495 using a precision holographic data recording apparatus operated by the manufacturer of holographic data storage medium 495.

In step 1820, Applicants' method establishes a tangential write threshold correlation factor 232 (FIGS. 2A, 7). In certain embodiments, the tangential write threshold correlation factor of step 1820 is set by the owner and/or operator of the holographic data storage system of step 1505. In certain embodiments, the tangential write threshold correlation factor of step 1820 is set by one or more computing systems, such as one or more of computing systems 710 (FIG. 7), 720 (FIG. 7), and/or 730 (FIG. 7).

In step 1830, Applicants' method establishes a first rotated write threshold correlation factor 234 (FIGS. 2A, 7). In certain embodiments, the first rotated write threshold correlation factor of step 1830 is set by the owner and/or operator of the holographic data storage system of step 1505. In certain embodiments, the first rotated write threshold correlation factor of step 1830 is set by one or more computing systems, such as one or more of computing systems 710 (FIG. 7), 720 (FIG. 7), and/or 730 (FIG. 7).

In step 1840, Applicants' method establishes a second rotated write threshold correlation factor 236 (FIGS. 2A, 7). In certain embodiments, the second rotated write threshold correlation factor of step 1840 is set by the owner and/or operator of the holographic data storage system of step 1505. In certain embodiments, the second rotated write threshold correlation factor of step 1840 is set by one or more computing systems, such as one or more of computing systems 710 (FIG. 7), 720 (FIG. 7), and/or 730 (FIG. 7).

In step 1850, the method provides a reference beam, such as reference beam 190 (FIGS. 1A, 4A, 4B). In step 1860, the method illuminates the holographic data storage medium of step 1810 with the reference beam of step 1850 to generate a write data beam, such as write data beam 450 (FIG. 4A), wherein that write data beam comprises a reconstructed write orientation image, such as reconstructed write orientation image 430 (FIG. 4A).

In step 1870, the method projects the write data beam of step 1860 onto an optical detector, such as optical detector 410 (FIGS. 1A, 1B, 4A, 4B, 5A, 6), such that the reconstructed write orientation image 430 is disposed on the input screen portion of the optical detector, such as input screen 420 (FIGS. 4A, 4B, 5A, 6).

Figure 12:
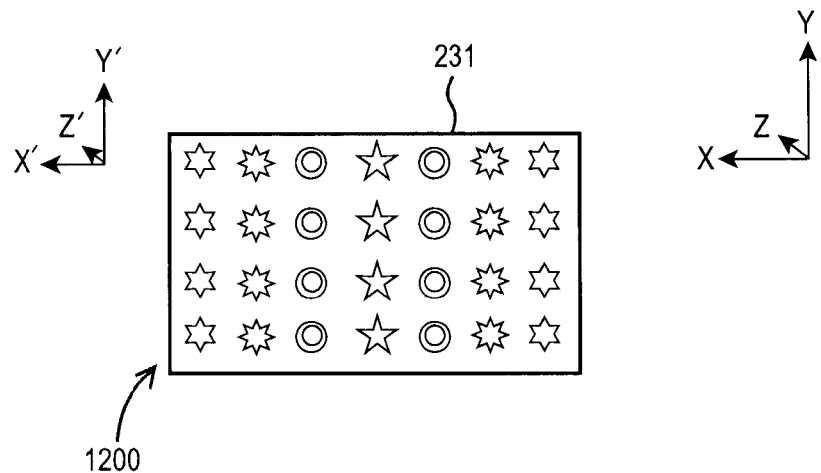
FIG. 12 shows one embodiment of a reconstructed write orientation image as seen through a tangential write matched filter.

The method transitions from step 1870 to step 1910 (FIG. 19A). Referring now to FIG. 19A, in step 1910 the method determines a tangential write correlation factor using the reconstructed write orientation image of step 1060, a stored write orientation image, such as stored write orientation image 231 (FIGS. 2A, 7), and a tangential write matched filter, such as tangential write matched filter 233 (FIGS. 2A, 7). Referring now to FIG. 12, image 1200 comprises stored write orientation image 231 (FIGS. 2A, 7) as seen through Applicants' tangential write matched filter 233 (FIGS. 2A, 7), wherein the X' axis of image 1200 is parallel to the X axis of optical detector 410 (FIGS. 1A, 1B, 4A, 4B, 5A, 6), and wherein the Y' axis of image 1600 is parallel to the Y axis of optical detector 410 (FIGS. 1A, 1B, 4A, 4B, 5A, 6), and wherein the Z' axis of image 1200 is parallel to the Z axis of optical detector 410 (FIGS. 1A, 1B, 4A, 4B, 5A, 6).

In certain embodiments, step 1910 is performed by Applicants' optical detector controller 510 (FIG. 5A). In certain embodiments, step 1910 is performed by Applicants' SLM controller 210 (FIG. 2A). In certain embodiments, step 1910 is performed by Applicants' storage controller 760 (FIG. 7). In certain embodiments, step 1910 is performed by a host computer in communication with Applicants' holographic data storage system 100. In certain embodiments, step 1910 is performed by a host computer in communication with Applicants' holographic data storage and retrieval system 700.

In certain embodiments, in step 1910 Applicants' method calculates the difference between the reconstructed write orientation image $g(x,y)$ and impulse response $h(x,y)=s^*(-x,-y)$ of the image 1600 (FIG. 16) using Equations (1) and (2). In certain embodiments, the tangential write correlation factor of step 1910, and/or the first rotated write correlation factor of step 1920, and/or the second rotated write correlation factor of step 1930, comprises a MAX_Difference which is equal to the maximum value of Difference(x,y). In other embodiments, the tangential write correlation factor of step 1910, and/or the first rotated write correlation factor of step 1920, and/or the second rotated write correlation factor of step 1930, comprises an AM_Difference comprising the arithmetic mean of the values of Difference(x,y). In still other embodiments, the tangential write correlation factor of step 1910, and/or the first rotated write correlation factor of step 1920, and/or the second rotated write correlation factor of step 1930, comprises a GM_Difference comprising the geometric mean of the values of Difference(x,y). In yet other embodiments, the tangential write correlation factor of step 1910, and/or the first rotated write correlation factor of step 1920, and/or the second rotated write correlation factor of step 1930, comprises an RMS_Difference comprising the root-mean-square of the values of Difference(x,y).

Figure 13:
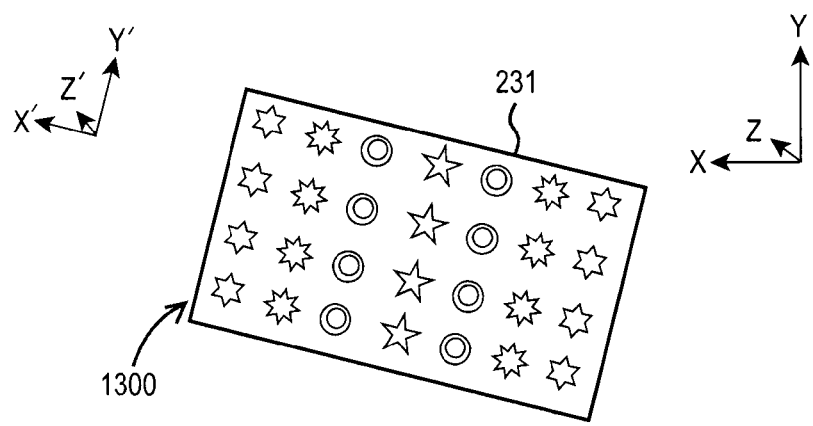
FIG. 13 shows one embodiment of a reconstructed write orientation image as seen through a first rotated write matched filter.

In step 1920, the method determines a first rotated write correlation factor using the reconstructed write orientation image of step 1860 (FIG. 18), the stored write orientation image 231 (FIGS. 2A, 7), and a first rotated write matched filter, such as Applicants' first rotated write matched filter 235 (FIGS. 2A, 7). Referring now to FIG. 13, image 1300 comprises image 231 as seen through Applicants' first rotated write matched filter 235 (FIGS. 2A, 7), wherein neither the X' axis nor the Y' axis of image 1300 is parallel to the X axis of the optical detector, but wherein the Z' axis of image 1300 is parallel to the Z axis of the optical detector.

The X' axis of image 1300 is rotated in a first direction from the X axis of the optical detector about the Z axis. In certain embodiments, the X' axis of image 1300 is rotated about the Z axis an increment of up to about one degree in a first direction from the X axis of the optical detector. In certain embodiments, the first rotated write correlation factor of step 1920 is calculated using Equations (1) and (2) as described hereinabove.

In certain embodiments, step 1920 is performed by Applicants' optical detector controller 510 (FIG. 5A). In certain embodiments, step 1120 is performed by Applicants' SLM controller 210 (FIG. 2A). In certain embodiments, step 1120 is performed by Applicants' storage controller 760 (FIG. 7). In certain embodiments, step 1120 is performed by a host computer in communication with Applicants' holographic data storage system 100. In certain embodiments, step 1120 is performed by a host computer in communication with Applicants' holographic data storage and retrieval system 700.

Figure 14:
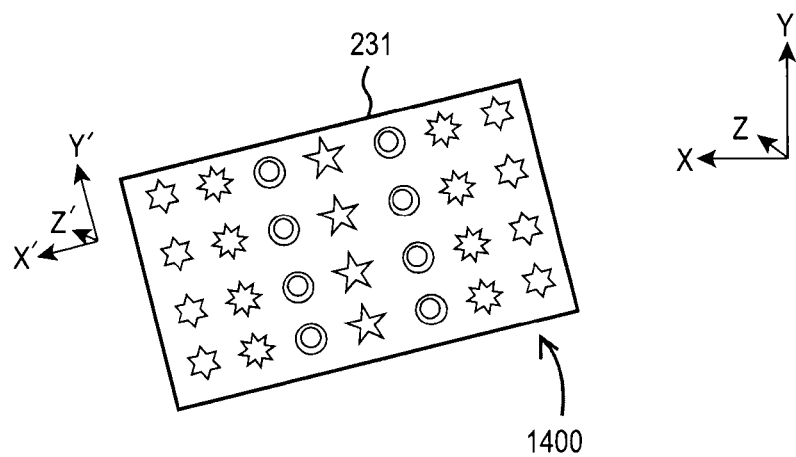
FIG. 14 shows one embodiment of a reconstructed write orientation image as seen through a second rotated write matched filter.

In step 1930, the method determines a second rotated write correlation factor using the reconstructed write orientation image of step 1860 (FIG. 18), the stored write orientation image 231 (FIGS. 2A, 7), and a second rotated write matched filter, such as Applicants' second write rotated matched filter 237 (FIGS. 2A, 7). Referring now to FIG. 14, image 1400 comprises image 231 as seen through Applicants' second rotated write matched filter 237, wherein neither the X' axis nor the Y' axis of image 1400 is parallel to the X axis of the optical detector, but wherein the Z' axis of image 1800 is parallel to the Z axis of the optical detector.

The X axis of the image 1400 is rotated in a second direction from the X axis of the optical detector about the Z axis. In certain embodiments, the X' axis of image 1400 is rotated about the Z axis an increment of up to about one degree in the second direction from the X axis of the optical detector. In certain embodiments, the second rotated write correlation factor of step 1930 is calculated using Equations (1) and (2) as described hereinabove.

In certain embodiments, step 1930 is performed by Applicants' optical detector controller 510 (FIG. 5A). In certain embodiments, step 1930 is performed by Applicants' SLM controller 210 (FIG. 2A). In certain embodiments, step 1930 is performed by Applicants' storage controller 760 (FIG. 7). In certain embodiments, step 1930 is performed by a host computer in communication with Applicants' holographic data storage system 100. In certain embodiments, step 1930 is performed by a host computer in communication with Applicants' holographic data storage and retrieval system 700.

In step 1940, the method determines if the tangential write correlation factor of step 1910 is greater than or equal to the tangential write threshold correlation factor 232 (FIGS. 2A, 7) set in step 1820 (FIG. 18). In certain embodiments, step 1940 is performed by Applicants' optical detector controller 510 (FIG. 5A). In certain embodiments, step 1940 is performed by Applicants' SLM controller 210 (FIG. 2A). In certain embodiments, step 1940 is performed by Applicants' storage controller 760 (FIG. 7). In certain embodiments, step 1940 is performed by a host computer in communication with Applicants' holographic data storage system 100. In certain embodiments, step 1940 is performed by a host computer in communication with Applicants' holographic data storage and retrieval system 700.

If the method determines in step 1940 that the tangential write correlation factor of step 1910 is greater than or equal to the tangential write threshold correlation factor of step 1820 (FIG. 18), then the method transitions from step 1940 to step 1960. Alternatively, if the method determines in step 1940 that the tangential write correlation factor of step 1910 is not greater than or equal to the tangential write threshold correlation factor of step 1820 (FIG. 18), then the method transitions from step 1940 to step 1950 wherein the method recalibrates the tangential write matched filter, and saves that new tangential write matched filter as tangential matched filter 232. In certain embodiments, step 1950 is performed by the owner and/or operator of the holographic data storage system of step 1505 (FIG. 15A).

The method transitions from step 1950 to step 1960 wherein the method determines if the first rotated write correlation factor of step 1920 is greater than or equal to the first rotated write threshold correlation factor 234 (FIGS. 2A, 7) set in step 1830 (FIG. 18). In certain embodiments, step 1960 is performed by Applicants' optical detector controller 510 (FIG. 5A). In certain embodiments, step 1960 is performed by Applicants' SLM controller 210 (FIG. 2A). In certain embodiments, step 1960 is performed by Applicants' storage controller 760 (FIG. 7). In certain embodiments, step 1960 is performed by a host computer in communication with Applicants' holographic data storage system 100. In certain embodiments, step 1960 is performed by a host computer in communication with Applicants' holographic data storage and retrieval system 700.

If the method determines in step 1960 that the first rotated write correlation factor of step 1920 is greater than or equal to the second rotated write threshold correlation factor of step 1830 (FIG. 18), then the method transitions from step 1960 to step 1980. Alternatively, if the method determines in step 1960 that the first rotated write correlation factor of step 1920 is not greater than or equal to the tangential write threshold correlation factor of step 1830 (FIG. 18), then the method transitions from step 1960 to step 1970 wherein the method recalibrates the first rotated write matched filter, and saves that new first rotated write matched filter as first rotated write matched filter 234. In certain embodiments, step 1970 is performed by the owner and/or operator of the holographic data storage system of step 1505 (FIG. 15A).

The method transitions from step 1970 to step 1980 wherein the method determines if the second rotated write correlation factor of step 1930 is greater than or equal to the second rotated write threshold correlation factor 236 (FIGS. 2A, 7) set in step 1840 (FIG. 18). In certain embodiments, step 1980 is performed by Applicants' optical detector controller 510 (FIG. 5A). In certain embodiments, step 1980 is performed by Applicants' SLM controller 210 (FIG. 2A). In certain embodiments, step 1980 is performed by Applicants' storage controller 760 (FIG. 7). In certain embodiments, step 1980 is performed by a host computer in communication with Applicants' holographic data storage system 100. In certain embodiments, step 1980 is performed by a host computer in communication with Applicants' holographic data storage and retrieval system 700.

If the method determines in step 1980 that the second rotated write correlation factor of step 1930 is greater than or equal to the second rotated write threshold correlation factor of step 1840 (FIG. 18), then the method transitions from step 1980 to step 1595 and ends. Alternatively, if the method determines in step 1980 that the second rotated write correlation factor of step 1930 is not greater than or equal to the second rotated write threshold correlation factor of step 1840 (FIG. 18), then the method transitions from step 1980 to step 1990 wherein the method recalibrates the second rotated write matched filter, and saves that new second rotated write matched filter as second rotated write matched filter 236. In certain embodiments, step 1990 is performed by the owner and/or operator of the holographic data storage system of step 1505 (FIG. 15A). The method transitions from step 1990 to step 1595 and ends.

In certain embodiments, individual steps recited in FIGS. 10, 11, 15, 18, and/or 19, may be combined, eliminated, or reordered.

Figure 11B:
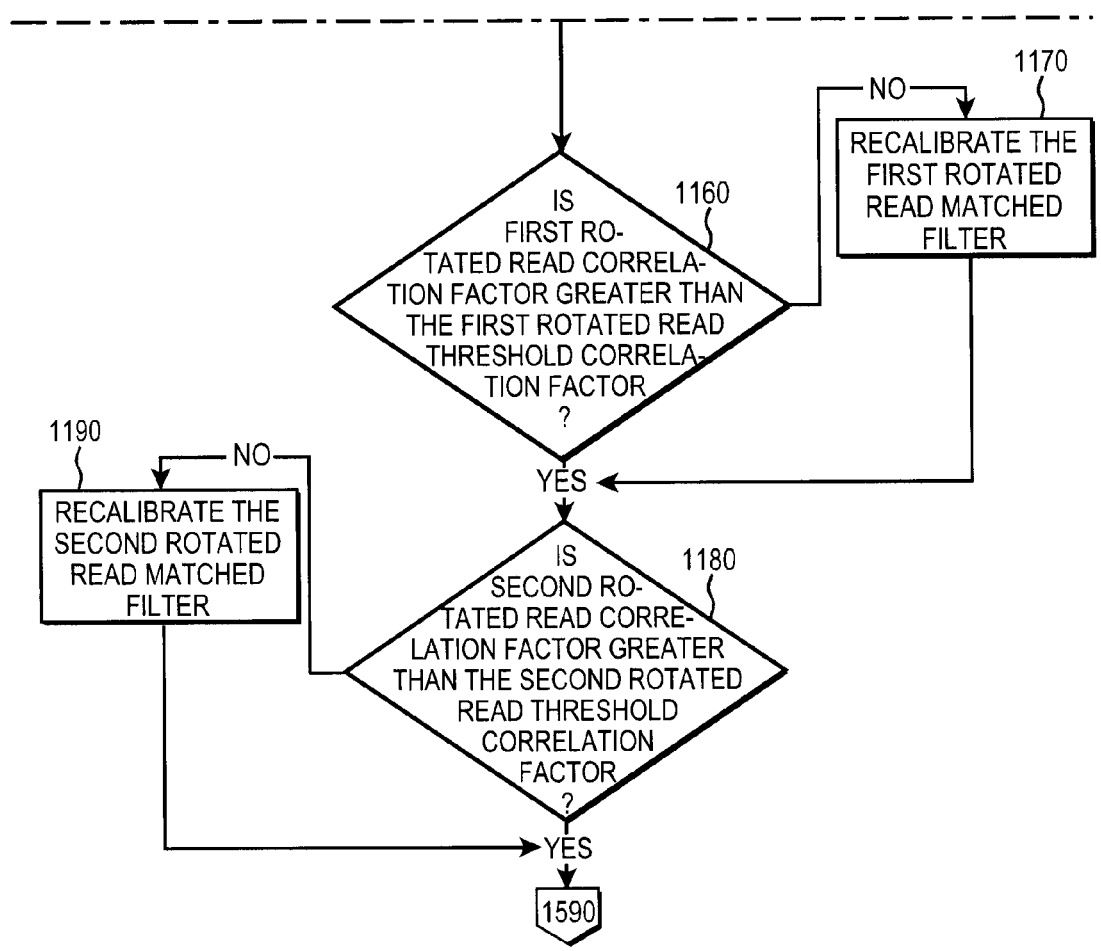
Figure 15B:
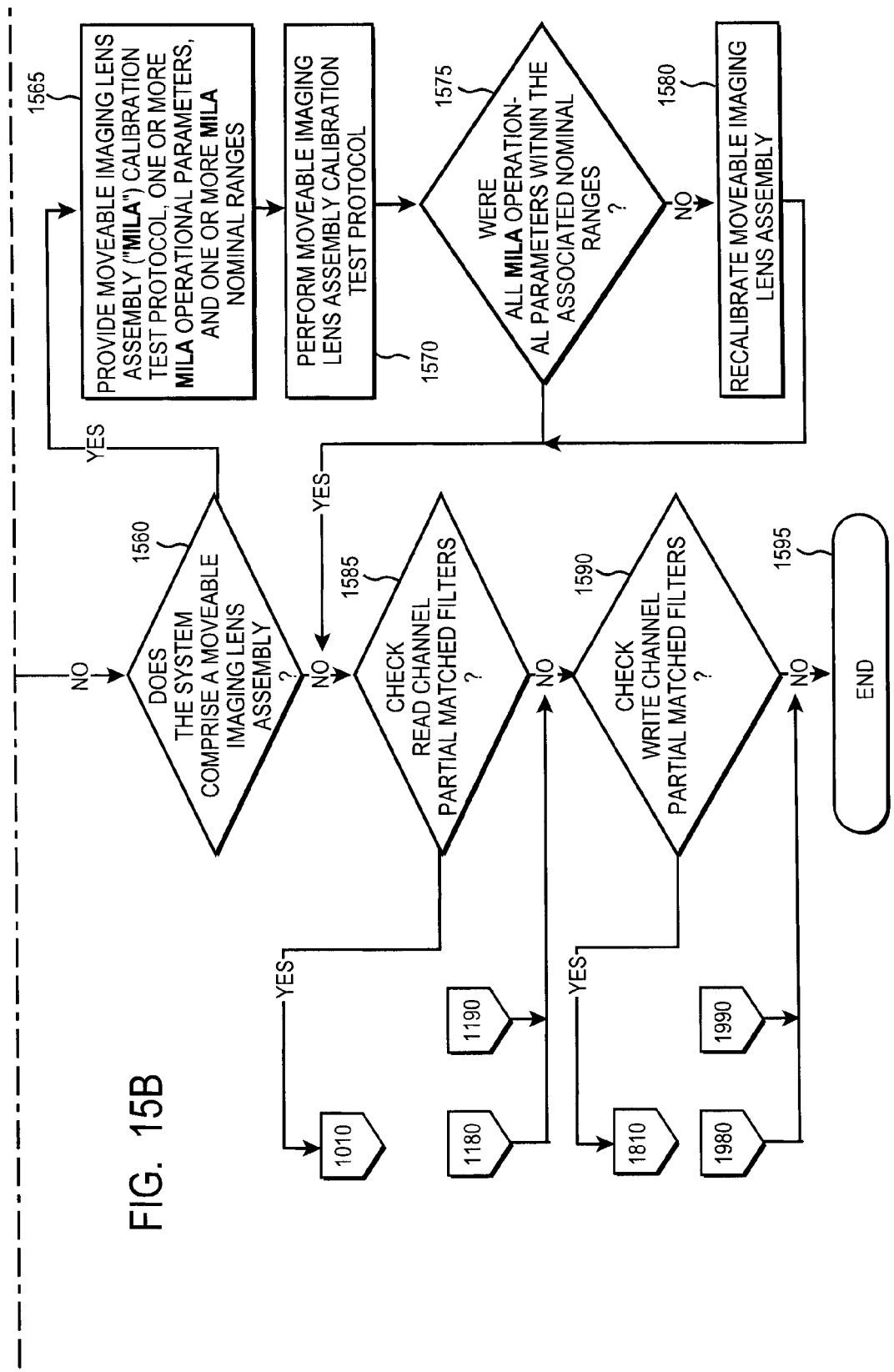
FIG. 15B is a flow charge summarizing additional steps of Applicants' method to check the calibration of one or more servos and/or solenoids.
Figure 19B:
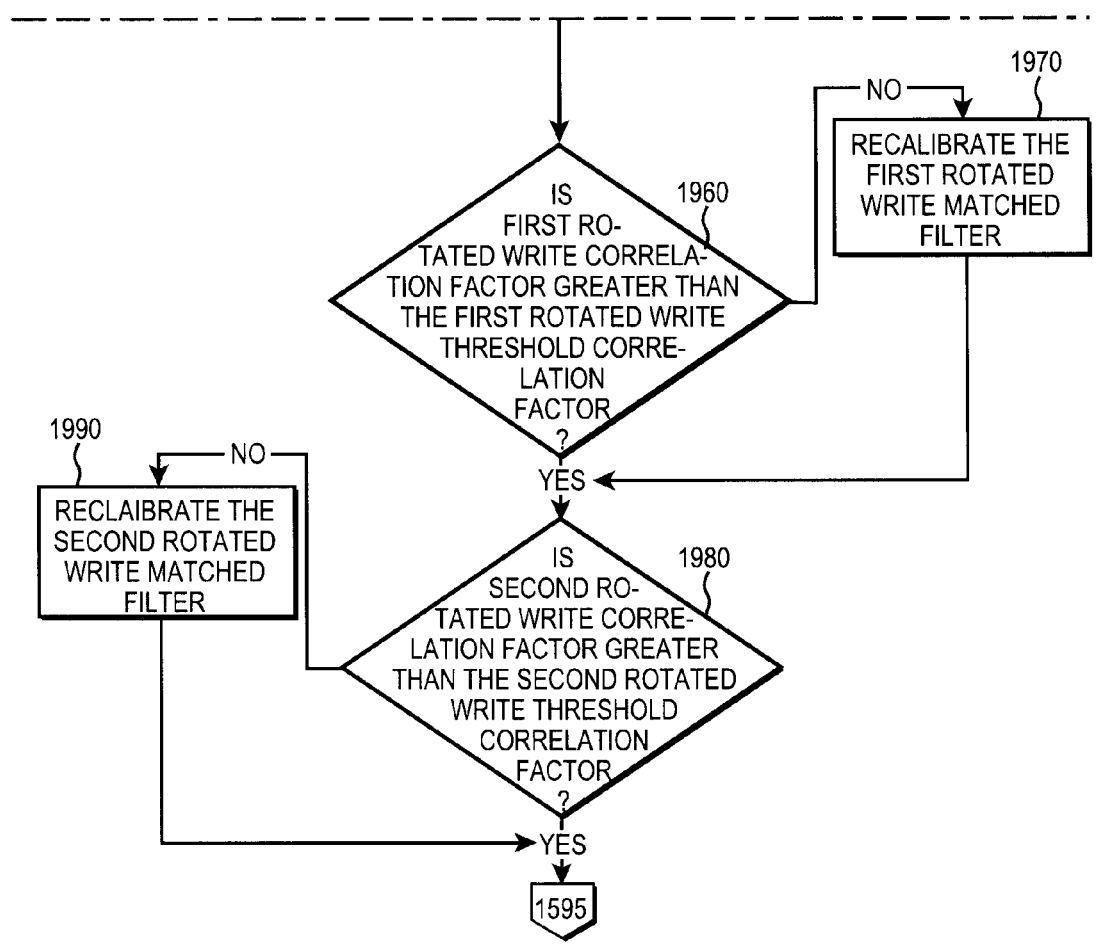

In certain embodiments, Applicants' invention includes instructions, such as instructions 225 (FIG. 2A), wherein those instructions are executed by a processor, such as processor 220 (FIG. 2A) and/or processor 764 (FIG. 7), and/or instructions 525 (FIG. 5A), wherein those instructions are executed by a processor, such as processor 520 (FIG. 2A) and/or processor 764 (FIG. 7), to perform one or more of steps 1020, 1030, 1040, 1050, and/or 1060 recited in FIG. 10, and/or one or more of steps 1110, 1120, 1130, 1140, 1150, 1160, 1170, 1180, and/or 1190, recited in FIGS. 11A and 11B and, and/or one or more of steps 1505, 1510, 1515, 1520, 1525, 1530, 1535, 1540, 1545, 1550, 1555, 1560, 1565, 1570, 1575, 1580, 1585, and/or 1590, recited in FIGS. 15A and 15B, and/or perform one or more of steps 1820, 1830, 1840, 1850, and/or 1860 recited in FIG. 18, and/or one or more of steps 1910, 1920, 1930, 1940, 1950, 1960, 1970, 1980, and/or 1990, recited in FIGS. 19A and 19B.

In other embodiments, Applicants' invention includes instructions residing in any other computer program product, where those instructions are executed by a computer external to, or internal to, system 100 and/or system 700, to perform one or more of steps 1020, 1030, 1040, 1050, and/or 1060 recited in FIG. 10, and/or one or more of steps 1110, 1120, 1130, 1140, 1150, 1160, 1170, 1180, and/or 1190, recited in FIGS. 11A and 11B, and/or one or more of steps 1505, 1510, 1515, 1520, 1525, 1530, 1535, 1540, 1545, 1550, 1555, 1560, 1565, 1570, 1575, 1580, 1585, and/or 1590, recited in FIGS. 15A and 15B, and/or perform one or more of steps 1820, 1830, 1840, 1850, and/or 1860 recited in FIG. 18, and/or one or more of steps 1910, 1920, 1930, 1940, 1950, 1960, 1970, 1980, and/or 1990, recited in FIGS. 19A and 19B. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to optimize the performance of a holographic data storage system, wherein said holographic data storage system comprises a plurality of calibratable components, wherein each of said plurality of calibratable components comprises one or operational parameters, and wherein each operational parameter is associated with a nominal range, comprising the step of:

determining if the one or more operational parameters associated with each of said calibratable components fall within the associated nominal ranges; and operative if an operational parameter associated with a selected calibratable components falls outside the associated nominal range, recalibrating said selected calibratable component;

operative if said holographic data storage system comprises a spatial light modulator comprising a position error servo ("PES"), providing a PES calibration test protocol, one or more PES operational parameters, and a PES nominal range associated with each PES operational parameter;

performing said PES calibration test;

determining a measured value for each of said one or more PES operational parameters;

determining if each measured PES operational parameter falls within the associated PES nominal range; and operative if each measured PES operational parameter does not fall within the associated PES nominal range, recalibrating said position error servo.

2. The method of claim 1, wherein said recalibrating step comprises the steps of:

operative if said holographic data storage system comprises an optical detector comprising a rotation error servo ("RES"), providing a RES calibration test protocol, one or more RES operational parameters, and a RES nominal range associated with each RES operational parameter;

performing said RES calibration test;

determining a measured value for each of said one or more RES operational parameters;

determining if each measured RES operational parameter falls within the associated RES nominal range; and operative if each measured RES operational parameter does not fall within the associated RES nominal range, recalibrating said rotation error servo.

3. The method of claim 1, wherein said recalibrating step comprises the steps of:

operative if said holographic data storage system comprises a moveable imaging lens assembly ("MILA"), providing a MILA calibration test protocol, one or more MILA operational parameters, and a MILA nominal range associated with each MILA operational parameter;

performing said MILA calibration test;

determining a measured value for each of said one or more MILA operational parameters;

determining if each measured MILA operational parameter falls within the associated MILA nominal range; and operative if each measured MILA operational parameter does not fall within the associated MILA nominal range, recalibrating said moveable imaging lens assembly solenoid.

4. The method of claim 1, wherein said recalibrating step comprises the steps of:

providing a holographic data storage medium comprising an encoded write orientation hologram;

illuminating said holographic data storage medium with a reference beam;

generating a reconstructed write orientation image;

projecting said reconstructed write orientation image onto an optical detector;

providing a reference write orientation image, a tangential write matched filter, and a tangential write threshold correlation factor;

calculating a tangential write correlation factor using said reconstructed write orientation image, said reference write orientation image, and said tangential write matched filter;

determining if said tangential write correlation factor is greater than or equal to said tangential write threshold correlation factor; and operative if said tangential write correlation factor is not greater than or equal to said tangential write threshold correlation factor, recalibrating said tangential write matched filter.

5. The method of claim 4, further comprising the steps of:

providing a first rotated write matched filter and a first rotated write threshold correlation factor;

calculating a first rotated write correlation factor using said reconstructed write orientation image, said reference write orientation image, and said first rotated write matched filter;

determining if said first rotated write correlation factor is greater than or equal to said first rotated write threshold correlation factor; and operative if said first rotated write correlation factor is not greater than or equal to said first rotated write threshold correlation factor, recalibrating said first rotated write matched filter.

6. The method of claim 5, further comprising the steps of:

providing a second rotated write matched filter and a second rotated write threshold correlation factor;

calculating a second rotated write correlation factor using said reconstructed write orientation image, said reference write orientation image, and said second rotated write matched filter;

determining if said second rotated write correlation factor is greater than or equal to said second rotated write threshold correlation factor; and operative if said second rotated write correlation factor is not greater than or equal to said second rotated write threshold correlation factor, recalibrating said second rotated write matched filter.

7. The method of claim 1, wherein said recalibrating step comprises the steps of:

providing a holographic data storage medium comprising an encoded read orientation hologram;

illuminating said holographic data storage medium with a reference beam;

generating a reconstructed read orientation image;

projecting said reconstructed read orientation image onto an optical detector;

providing a reference read orientation image, a tangential read matched filter, and a tangential read threshold correlation factor;

calculating a tangential read correlation factor using said reconstructed read orientation image, said reference read orientation image, and said tangential read matched filter;

determining if said tangential read correlation factor is greater than or equal to said tangential read threshold correlation factor; and operative if said tangential read correlation factor is not greater than or equal to said tangential read threshold correlation factor, recalibrating said tangential read matched filter.

8. The method of claim 7, further comprising the steps of:

providing a first rotated read matched filter and a first rotated read threshold correlation factor;

calculating a first rotated read correlation factor using said reconstructed read orientation image, said reference read orientation image, and said first rotated read matched filter;

determining if said first rotated read correlation factor is greater than or equal to said first rotated read threshold correlation factor; and operative if said first rotated read correlation factor is not greater than or equal to said first rotated read threshold correlation factor, recalibrating said first rotated read matched filter.

9. The method of claim 8, further comprising the steps of:

providing a second rotated read matched filter and a second rotated read threshold correlation factor;

calculating a second rotated read correlation factor using said reconstructed read orientation image, said reference read orientation image, and said second rotated read matched filter;

determining if said second rotated read correlation factor is greater than or equal to said second rotated read threshold correlation factor; and operative if said second rotated read correlation factor is not greater than or equal to said second rotated read threshold correlation factor, recalibrating said second rotated read matched filter.

10. An article of manufacture comprising a non-transitory computer readable medium having computer readable program code disposed therein to optimize the performance of a holographic data storage system, wherein said holographic data storage system comprises a plurality of calibratable components, wherein each of said plurality of calibratable components comprises one or more operational parameters, and wherein each operational parameter is associated with a nominal range, the computer readable program code comprising a series of computer readable program steps to effect:

determining if the one or more operational parameters associated with each of said calibratable component fall within the associated nominal range; and operative if an operational parameter associated with a selected calibratable components falls outside the associated nominal range, generating an alert message regarding recalibrating said selected calibratable component;

operative if said holographic data storage system comprises a spatial light modulator comprising a position error servo ("PES"), providing a PES calibration test protocol, one or more PES operational parameters, and a PES nominal range associated with each PES operational parameter;

performing said PES calibration test;

determining a measured value for each of said one or more PES operational parameters;

determining if each measured PES operational parameter falls within the associated PES nominal range; and operative if each measured PES operational parameter does not fall within the associated PES nominal range, generating an alert message regarding recalibrating said position error servo.

11. The article of manufacture of claim 10, wherein said computer readable program code to recalibrate a selected calibratable component further comprises a series of computer readable program steps to effect:

operative if said holographic data storage system comprises an optical detector comprising a rotation error servo ("RES"), providing a RES calibration test protocol, one or more RES operational parameters, and a RES nominal range associated with each RES operational parameter;

performing said RES calibration test;

determining a measured value for each of said one or more RES operational parameters;

determining if each measured RES operational parameter falls within the associated RES nominal range; and operative if each measured RES operational parameter does not fall within the associated RES nominal range, generating an alert message regarding recalibrating said rotation error servo.

12. The article of manufacture of claim 10, wherein said computer readable program code to recalibrate a selected calibratable component further comprises a series of computer readable program steps to effect:

operative if said holographic data storage system comprises a moveable imaging lens assembly comprising a moveable imaging lens assembly solenoid ("MILA"), providing a MILA calibration test protocol, one or more MILA operational parameters, and a MILA nominal range associated with each MILA operational parameter;

performing said MILA calibration test;

determining a measured value for each of said one or more MILA operational parameters;

determining if each measured MILA operational parameter falls within the associated MILA nominal range; and operative if each measured MILA operational parameter does not fall within the associated MILA nominal range, generating an alert message regarding recalibrating said moveable imaging lens assembly solenoid.

13. The article of manufacture of claim 10, further comprising an optical detector, a holographic data storage medium comprising an encoded write orientation hologram, a reference write orientation image, a tangential write matched filter, and a tangential write threshold correlation factor, wherein said computer readable program code to recalibrate a selected calibratable component further comprises a series of computer readable program steps to effect:

illuminating said holographic data storage medium with a reference beam to generate and project a reconstructed write orientation image onto said optical detector;

calculating a tangential write correlation factor using said reconstructed write orientation image, said reference write orientation image, and said tangential write matched filter;

determining if said tangential write correlation factor is greater than or equal to said tangential write threshold correlation factor; and operative if said tangential write correlation factor is not greater than or equal to said tangential write threshold correlation factor, generating an alert message regarding recalibrating said tangential write matched filter.

14. The article of manufacture of claim 13, further comprising a first rotated write matched filter and a first rotated write threshold correlation factor, wherein said computer readable program code to recalibrate a selected calibratable component further comprises a series of computer readable program steps to effect:

calculating a first rotated write correlation factor using said reconstructed write orientation image, said reference write orientation image, and said first rotated write matched filter;

determining if said first rotated write correlation factor is greater than or equal to said first rotated write threshold correlation factor; and operative if said first rotated write correlation factor is not greater than or equal to said first rotated write threshold correlation factor, generating an alert message regarding recalibrating said first rotated write matched filter.

15. The article of manufacture of claim 14, further comprising a second rotated write matched filter and a second rotated write threshold correlation factor, wherein said computer readable program code to recalibrate a selected calibratable component further comprises a series of computer readable program steps to effect:

calculating a second rotated write correlation factor using said reconstructed write orientation image, said reference write orientation image, and said second rotated write matched filter;

determining if said second rotated write correlation factor is greater than or equal to said second rotated write threshold correlation factor; and operative if said second rotated write correlation factor is not greater than or equal to said second rotated write threshold correlation factor, generating an alert message regarding recalibrating said second rotated write matched filter.

16. The article of manufacture of claim 10, further comprising an optical detector, a holographic data storage medium comprising an encoded read orientation hologram, a reference read orientation image, a tangential read matched filter, and a tangential read threshold correlation factor, wherein said computer readable program code to recalibrate a selected calibratable component further comprises a series of computer readable program steps to effect:

illuminating said holographic data storage medium with a reference beam to generate and project a reconstructed read orientation image onto said optical detector;

calculating a tangential read correlation factor using said reconstructed read orientation image, said reference read orientation image, and said tangential read matched filter;

determining if said tangential read correlation factor is greater than or equal to said tangential read threshold correlation factor; and operative if said tangential read correlation factor is not greater than or equal to said tangential read threshold correlation factor, generating an alert message regarding recalibrating said tangential read matched filter.

17. The article of manufacture of claim 16, further comprising providing a first rotated read matched filter and a first rotated read threshold correlation factor, wherein said computer readable program code to recalibrate a selected calibratable component further comprises a series of computer readable program steps to effect:

calculating a first rotated read correlation factor using said reconstructed read orientation image, said reference read orientation image, and said first rotated read matched filter;

determining if said first rotated read correlation factor is greater than or equal to said first rotated read threshold correlation factor; and operative if said first rotated read correlation factor is not greater than or equal to said first rotated read threshold correlation factor, generating an alert message regarding recalibrating said first rotated read matched filter.

18. The article of manufacture of claim 17, further comprising providing a second rotated read matched filter and a second rotated read threshold correlation factor, wherein said computer readable program code to recalibrate a selected calibratable component further comprises a series of computer readable program steps to effect:

calculating a second rotated read correlation factor using said reconstructed read orientation image, said reference read orientation image, and said second rotated read matched filter;

determining if said second rotated read correlation factor is greater than or equal to said second rotated read threshold correlation factor; and operative if said second rotated read correlation factor is not greater than or equal to said second rotated read threshold correlation factor, generating an alert message regarding recalibrating said second rotated read matched filter.

\* \* \* \* \*